United States Patent
Mawson et al.

(10) Patent No.: US 6,608,149 B2
(45) Date of Patent: Aug. 19, 2003

(54) POLYMERIZATION PROCESS

(75) Inventors: Simon Mawson, Charleston, WV (US); Sun-Chueh Kao, Belle Mead, NJ (US); Tae Hoon Kwalk, Belle Mead, NJ (US); Timothy Roger Lynn, Hackettstown, NJ (US); David H. McConville, Houston, TX (US); Matthew Gary McKee, Charleston, WV (US); John Francis Szul, Nitro, WV (US); Kersten Anne Terry, South Charleston, WV (US); Timothy T. Wenzel, Charleston, WV (US); Mark Gregory Goode, Hurricane, WV (US); John Henry Oskam, Flemington, NJ (US); Robert J. Jorgensen, Belle Mead, NJ (US); Robert Harold Vogel, Ringoes, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/729,453

(22) Filed: Dec. 4, 2000

(65) Prior Publication Data

US 2003/0008980 A1 Jan. 9, 2003

(51) Int. Cl.$^7$ .................................................. C08F 2/34
(52) U.S. Cl. ........................ 526/60; 526/90; 526/129; 526/159; 526/160; 526/905; 526/943; 526/113
(58) Field of Search .................... 526/60, 943, 159, 526/905, 160, 129, 90, 113

(56) References Cited

U.S. PATENT DOCUMENTS

| | | | |
|---|---|---|---|
| 5,317,036 A | * 5/1994 | Brady, III et al. | 523/223 |
| 5,693,727 A | 12/1997 | Goode et al. | 526/86 |
| 6,069,213 A | 5/2000 | Nemzek et al. | 502/117 |

FOREIGN PATENT DOCUMENTS

| | | |
|---|---|---|
| CN | 97116451.7 | 3/1999 |
| EP | A 0 593 083 | 4/1994 |
| EP | A 0 965 601 | 12/1999 |
| WO | WO 97/46599 | 12/1997 |

OTHER PUBLICATIONS

Chu et al., "Effect of Hydrogen on Ethylene Polymerization with In–Situ Supported Metallocene Catalysts", Institute for Polymer Research, Dept. of Chem. Eng., University of Waterloo, Waterloo, Ontario N2L 3G1, Canada.

Chu, et al., "Polymerization Mechanism for In–Situ Supported Metallocene Catalysts", Institute for Polymer Research, Dept. of Chem. Eng., University of Waterloo, Waterloo, Ontario N2L 3G1, Canada.

Chu, et al., "Variation of Molecular Weight Distribution (WMD) and Short Chain Branching Distribution (SCBD) of Ethylene/1–Hexene Copolymers Produced with Different IN–Situ Supported Metallocene Catalysts", Institute for Polymer Research, Dept. of Chem. Eng., University of Waterloo, Waterloo, Ontario N2L 3G1, Canada.

(List continued on next page.)

Primary Examiner—David W. Wu
Assistant Examiner—William Cheung
(74) Attorney, Agent, or Firm—Lisa Kimes Jones; Kevin M. Faulkner

(57) ABSTRACT

The invention provides for polymerization catalyst compositions, and for methods for introducing the catalyst compositions into a polymerization reactor. More particularly, the method combines a catalyst component containing slurry and a catalyst component containing solution to form the completed catalyst composition for introduction into the polymerization reactor. The invention is also directed to methods of preparing the catalyst component slurry, the catalyst component solution and the catalyst compositions, to methods of controlling the properties of polymer products utilizing the catalyst compositions, and to polymers produced therefrom.

11 Claims, 5 Drawing Sheets

OTHER PUBLICATIONS

Soares, et al., "*Environmental Stress Cracking Resistance of Polethylene: Use Of Crystaf and Sec to Establish Structure–Property Relationships*", Institute for Polymer Research, Dept. of Chem. Eng., University of Waterloo, Waterloo, Ontario N2L 3G1, Canada.

J.B.P. Soares and J.D. Kim, "*Copolymerization of Ethylene and α–Olefins With Combined Metallocene Catalysts. I. A Formal Criterion for Molecular Weight Bimodality*", Institute for Polymer Research, Department of Chemical Engineering, University of Waterloo, Waterloo, Ontario, Canada N2L 3G1.

J.D. Kim and J.B.P. Soares, "*Copolymerization of Ethylene and α–Olefins Wtih Combined Metallocene Catalysts. II. Mathematical Modelling of Polymerization with Single Metallocene Catalysts*", Institute for Polymer Research, Department of Chemical Engineering, University of Waterloo, Waterloo, Ontario, Canada N2L 3G1.

J.D. Kim and J.B.P. Soares, "*Copolymerization of Ethylene and α–Olefins WIth Combined Metallocene Catalysts. III. Production of Polyolefins with Tailored Microstructure*", Institute for Polymer Research, Department of Chemical Engineering, University of Waterloo, Waterloo, Ontario, Canada N2L 3G1.

* cited by examiner

POLYMERIZATION PROCESS

FIELD OF THE INVENTION

The invention relates to a process for polymerizing olefin(s). Generally, the invention relates to polymerization catalyst compositions, and to methods for introducing the catalyst compositions into a polymerization reactor. More particularly, the method combines a catalyst component slurry with a catalyst component solution to form the completed catalyst composition for introduction into the polymerization reactor. The invention also relates to methods of preparing the catalyst component slurries, the catalyst component solutions, and the catalyst compositions, to methods of controlling the properties of polymer products utilizing the catalyst compositions, and to polymers produced therefrom.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene catalyst systems and other advanced metallocene-type catalyst systems.

To utilize these systems in industrial slurry or gas phases processes, it is useful that the catalyst compound be immobilized on a carrier or support such as, for example silica or alumina. The use of supported or heterogeneous catalysts increases process efficiencies by assuring that the forming polymeric particles achieve a shape and density that improves reactor operability and ease of handling. However, bulky ligand metallocene and metallocene-type catalysts typically exhibit lower activity when supported than when utilized in unsupported or homogeneous form. This "support effect" makes comercialization of these promising catalyst systems more difficult.

U.S. Pat. Nos. 5,317,036 and 5,693,727 and European publication EP-A-0 593 083 and PCT publication WO 97/46599 all describe various processes and techniques for introducing liquid unsupported catalysts to a polymerization reactor.

U.S. Pat. No. 6,069,213 discloses combining a supported and an unsupported metallocene catalysts in the polymerization of olefins, European publication EP 0 965 601A disclose a combination of a solid Ziegler-Natta catalyst with a liquid catalyst in toluene or Kaydol activated with methyl alumoxane or modified methyl alumoxane, and Chinese Published Patent Application No. 97116451.7 discloses combining an unsupported metallocene with a supported methylalumoxane. None of these references, however, discloses a catalyst composition prepared by continuously combining a catalyst component slurry with a catalyst component solution, then introducing the combination into an operating polymerization reactor.

While all these methods have been described in the art, there exists a need to reduce the support effect for bulky ligand metallocene and metallocene-type polymerization catalyst compositions, for an improved method for introducing catalyst compositions, and especially for introducing mixed catalyst compositions, into a polymerization reactors, and for methods to control the properties of polymer products utilizing such catalyst compositions.

SUMMARY OF THE INVENTION

The invention generally provides polymerization catalyst compositions and methods for introducing the catalyst compositions into a polymerization reactor. More particularly, the method combines a catalyst component containing slurry and a catalyst component containing solution to form the completed catalyst composition for introduction into the polymerization reactor. The invention is also directed to methods of preparing the catalyst component slurry, the catalyst component solution, and the catalyst compositions, to methods of controlling the properties of polymer products utilizing the catalyst compositions, and to polymers produced therefrom.

In one aspect, the invention provides a process to polymerize olefin(s) which includes the steps of continuously combining a catalyst component slurry with a catalyst component solution to form a catalyst composition and introducing the catalyst composition and one or more olefin(s) into an operating polymerization reactor.

In another aspect, the invention provides a process to control polymer properties which includes the steps of continuously combining a catalyst component slurry with a catalyst component solution to form a catalyst composition, introducing the catalyst composition into a polymerization reactor with one or more olefin(s) to form a polymer product, measuring a sample of the polymer product to obtain an initial product property and changing a process parameter to obtain a second product property.

DETAILED DESCRIPTION OF THE INVENTION

I. Introduction

Figure 1:
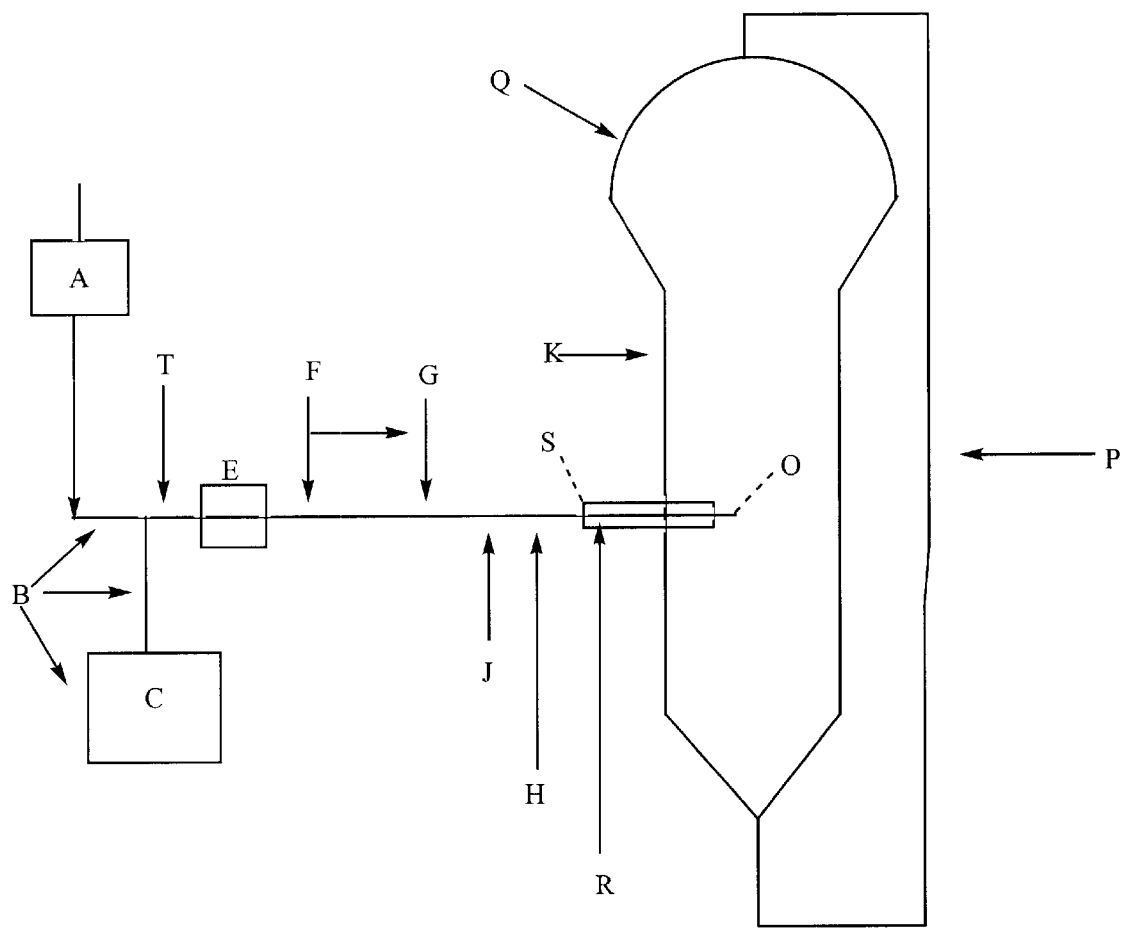
FIG. 1 illustrates an embodiment of one equipment configuration to utilize the invention.

The components of the catalyst composition of the invention include catalyst compounds, activator compounds and support materials. The catalyst components are utilized in a slurry and/or in a solution where the slurry and solution are combined then introduced into a polymerization reactor.

II. Catalyst Compounds

The catalyst compounds which may be utilized in the catalyst compositions of the invention include invention include: Group 15 containing metal compounds; bulky ligand metallocene compounds; phenoxide catalyst compounds; additionally discovered catalyst compounds; and conventional-type transition metal catalysts.

A. Group 15 Containing Metal Catalyst Compound

The catalyst composition of the invention may include one or more Group 15 containing metal catalyst compounds. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment, the Group 15 containing metal compound of the present invention may be represented by the formulae:

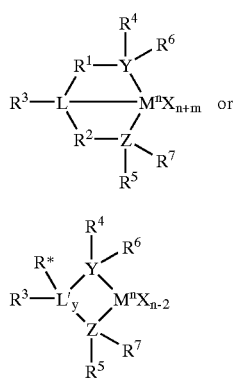

Formula I

Formula II wherein
- M is a Group 3 to 12 transition metal or a Group 13 or 14 main group metal, preferably a Group 4, 5, or 6 metal, and more preferably a Group 4 metal, and most preferably zirconium, titanium or hafnium,
- each X is independently a leaving group, preferably, an anionic leaving group, and more preferably hydrogen, a hydrocarbyl group, a hetero atom or a halogen, and most preferably an alkyl.
- y is 0 or 1 (when y is 0 group L' is absent),
- n is the oxidation state of M, preferably +3, +4, or +5, and more preferably +4,
- m is the formal charge of the YZL or the YZL' ligand, preferably 0, −1, −2 or −3, and more preferably −2,
- L is a Group 15 or 16 element, preferably nitrogen,
- L' is a Group 15 or 16 element or Group 14 containing group, preferably carbon, silicon or germanium,
- Y is a Group 15 element, preferably nitrogen or phosphorus, and more preferably nitrogen,
- Z is a Group 15 element, preferably nitrogen or phosphorus, and more preferably nitrogen,
- $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.
- $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen
- $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group,
- $R^1$ and $R^2$ may be interconnected to each other, and/or $R^4$ and $R^5$ may be interconnected to each other,
- $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and
- R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

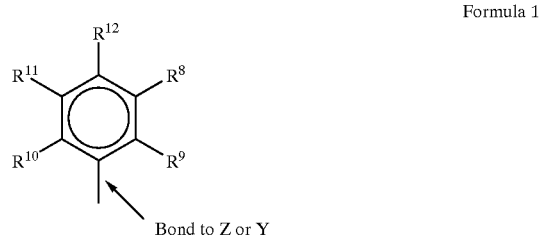

Formula 1

Bond to Z or Y wherein
- $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

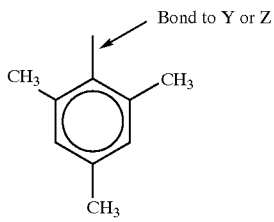

Formula 2

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In a particularly preferred embodiment the Group 15 containing metal compound is represented by Compound 1 below:

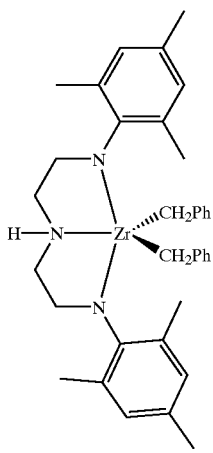

In compound 1, Ph equals phenyl.

The Group 15 containing metal compounds utilized in the catalyst composition of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, U.S. Pat. No. 5,271,325 discloses a gas or slurry phase polymerization process using a supported bisamide catalyst, which is also incorporated herein by reference.

A preferred direct synthesis of these compounds comprises reacting the neutral ligand, (see for example YZL or YZL' of formula I or II) with $M^nX_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula I or II) with a compound represented by the formula $M^nX_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

For additional information of Group 15 containing metal compounds, please see Mitsui Chemicals, Inc. in EP 0 893 454 A1 which discloses transition metal amides combined with activators to polymerize olefins.

In one embodiment the Group 15 containing metal compound is allowed to age prior to use as a polymerization. It has been noted on at least one occasion that one such catalyst compound (aged at least 48 hours) performed better than a newly prepared catalyst compound.

B. Bulky Ligand Metallocene Compounds

The catalyst composition of the invention may include one or more bulky ligand metallocene compounds (also referred to herein as metallocenes).

Generally, bulky ligand metallocene compounds include half and fall sandwich compounds having one or more bulky ligands bonded to at least one metal atom. Typical bulky ligand metallocene compounds are generally described as containing one or more bulky ligand(s) and one or more leaving group(s) bonded to at least one metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the catalyst composition of the invention includes one or more bulky ligand metallocene catalyst compounds represented by the formula:

$$L^A L^B M Q_n \qquad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula III only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula III above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the invention may include one or more bulky ligand metallocene catalyst compounds where $L^A$ and $L^B$ of Formula III are bridged to each other by at least one bridging group, A, as represented by Formula IV.

$$L^A A L^B M Q_n \qquad\qquad (IV)$$

The compounds of Formula IV are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula IV have two or more bridging groups A (EP 664 301 B1).

In another embodiment, the bulky ligand metallocene catalyst compounds are those where the R substituents on the bulky ligands $L^A$ and $L^B$ of Formulas III and IV are substituted with the same or different number of substituents on each of the bulky ligands. In another embodiment, the bulky ligands $L^A$ and $L^B$ of Formulas III and IV are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, W096/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition of the invention includes one or more bulky ligand metallocene catalyst compounds represented by Formula V:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0,1 or 2. In Formula V above, $L^C$, A and J form a fused ring system. In an embodiment, $L^C$ of Formula V is as defined above for $L^A$. A, M and Q of Formula V are as defined above in Formula III.

In Formula V J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258 all of which are herein incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, U.S. Pat. No. 6,103,657 which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the catalyst composition of the invention includes one or more bulky ligand metallocene catalyst compounds is represented by Formula VI:

$$L^D MQ_2(YZ)X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VI, L and M are as defined above for Formula III. Q is as defined above for Formula III, preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. application Ser. No. 09/191,916 filed Nov. 13, 1998 pending.

Illustrative but non-limiting examples of bulky ligand metallocene catalyst compounds include: bis (cyclopentadienyl)titanium dimethyl, bis(cyclopentadienyl) titanium diphenyl, bis(cyclopentadienyl)zirconium dimethyl, bis(cyclopentadienyl)zirconium diphenyl, bis (cyclopentadienyl)haffium dimethyl or diphenyl, bis (cyclopentadienyl)titanium di-neopentyl, bis (cyclopentadienyl)zirconium di-neopentyl, bis (cyclopentadienyl)titanium dibenzyl, bis(cyclopentadienyl) zirconium dibenzyl, bis(cyclopentadienyl)vanadium dimethyl, bis(cyclopentadienyl)titanium methyl chloride, bis(cyclopentadienyl)titanium ethyl chloride, bis (cyclopentadienyl)titanium phenyl chloride, bis (cyclopentadienyl)zirconium methyl chloride, bis (cyclopentadienyl)zirconium ethyl chloride, bis (cyclopentadienyl)zirconium phenyl chloride, bis (cyclopentadienyl)titanium methyl bromide, cyclopentadienyl titanium trimethyl, cyclopentadienyl zirconium triphenyl, cyclopentadienyl zirconium trineopentyl, cyclopentadienyl zirconium trimethyl, cyclopentadienyl hafnium triphenyl, cyclopentadienyl hafnium trineopentyl, cyclopentadienyl hafnium trimethyl, pentamethylcyclopentadienyl titanium trichloride, pentaethylcyclopentadienyl titanium trichloride, bis(indenyl)titanium diphenyl or dichloride, bis(methylcyclopentadienyl)titanium diphenyl or dihalide, bis(1,2-dimethylcyclopentadienyl)titanium diphenyl or dichloride, bis(1,2-diethylcyclopentadienyl) titanium diphenyl or dichloride, bis(pentamethyl cyclopentadienyl)titanium diphenyl or dichloride; dimethyl silyldicyclopentadienyl titanium diphenyl or dichloride, methyl phosphine dicyclopentadienyl titanium diphenyl or dichloride, methylenedicyclopentadienyl titanium diphenyl or dichloride, isopropyl(cyclopentadienyl)(fluorenyl) zirconium dichloride, isopropyl(cyclopentadienyl) (octahydrofluorenyl)zirconium dichloride, diisopropylmethylene(cyclopentadienyl)(fluorenyl) zirconium dichloride, diisobutylmethylene (cyclopentadienyl)(fluorenyl)zirconium dichloride, ditertbutylmethylene(cyclopentadienyl)(fluorenyl) zirconium dichloride, cyclohexylidene(cyclopentadienyl) (fluorenyl)zirconium dichloride, diisopropylmethylene(2,5-dimetycyclopentadienyl)(fluorenyl)zirconium dichloride, isopropyl(cyclopentadienyl)(fluorenyl)hafniium dichloride, diphenylmethylene (cyclopentadienyl)(fluorenyl)hafnium dichloride, diisopropylmethylene (cyclopentadienyl) (fluorenyl)hafnium dichloride, diisobutylnethylene (cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl) hafnium dichloride, diisopropylmethylene(2,5-dimethylcyclopentadienyl) (fluorenyl)-hafnium dichloride, isopropyl(cyclopentadienyl)(fluorenyl)titanium dichloride, diphenylmethylene (cyclopentadienyl)(fluorenyl)titanium dichloride, diisopropylmethylene (cyclopentadienyl) (fluorenyl)titanium dichloride, diisobutylmethylene (cyclopentadienyl)(fluorenyl)titanium dichloride, ditertbutylmethylene (cyclopentadienyl)(fluorenyl)titanium dichloride, cyclohexylidene(cyclopentadienyl) (fluorenyl) titanium dichloride, diisopropylmethylene(2,5 dimethylcyclopentadienyl fluorenyl)titanium dichloride, racemic-ethylene bis(1-indenyl)zirconium (W) dichloride, racemic-ethylene bis (4,5,6,7-tetrahydro-1-indenyl)zirconium (IV) dichloride, racemic-dimethylsilyl bis (1-indenyl)zirconium (IV) dichloride, racemic-dimethylsilyl bis (4,5,6,7-tetrahydro-1-indenyl)zirconium (IV) dichloride, racemic-1,1,2,2-tetramethylsilanylene bis (1-indenyl)zirconium (IV) dichloride, racemic-1,1,2,2-tetramethylsilanylene bis (4,5,6,7-tetrahydro-1-indenyl)zirconium (IV) dichloride, ethylidene (1-indenyl tetramethylcyclopentadienyl)zirconium (IV) dichloride, racemic-dimethylsilyl bis (2-methyl-4-t-butyl-1-cyclopentadienyl)zirconium (IV) dichloride, racemic-ethylene bis (1-indenyl)hafnimn (IV) dichloride, racemic-ethylene bis (4,5,6,7-tetrahydro-1-indenyl)hafiium (IV) dichloride, racemic-dimethylsilyl bis (1-indenyl) hafaium (IV) dichloride, racemic-dimethylsilyl bis (4,5,6,7-tetrahydro-1-indenyl)hafnium (IV) dichloride, racemic-1,1,2,2-tetramethylsilanylene bis (1-indenyl)hafnium (IV) dichloride, racemic-1,1,2,2-tetramethylsilanylene bis (4,5,6,7-tetrahydro-1-indenyl)hafnium (IV), dichloride, ethylidene (1-indenyl-2,3,4,5-tetramethyl-1-cyclopentadienyl)hafnium (IV) dichloride, racemic-ethylene bis (1-indenyl)titanium (IV) dichloride, racemic-ethylene bis (4,5,6,7-tetrahydro-1-indenyl)titanium (IV) dichloride, racemic-dimethylsilyl bis (1-indenyl)titanium (IV) dichloride, racemic-dimethylsilyl bis (4,5,6,7-tetrahydro-1-indenyl)titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl)titanium (IV) dichloride.

Preferred bulky ligand metallocene catalyst compounds are diphenylmethylene (cyclopentadienyl)(fluorenyl) zirconium dichloride, racemic-dimethylsilyl bis (2-methyl-1-indenyl)zirconium (IV) dichloride, racemic-dimethylsilyl bis (2-methyl-4-(1-naphthyl-1-indenyl)zirconium (IV) dichloride, and racemic-dimethylsilyl bis (2-methyl-4-phenyl-1-indenyl)zirconium (IV) dichloride. Other preferred bulky ligand metallocene catalyst compounds include, indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl)zirconium tris (diethylcarbamate), (methylcyclopentadienyl)zirconium tris (pivalate), cyclopentadienyl tris(pivalate), and (pentamethylcyclopentadienyl)zirconium tris(benzoate).

C. Phenoxide Catalyst Compound

The catalyst composition of the invention may include one or more phenoxide catalyst compounds represented by the following formulae:

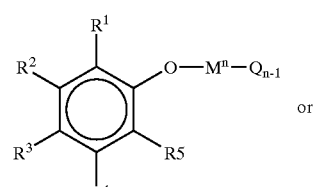

Formula (VII)

or

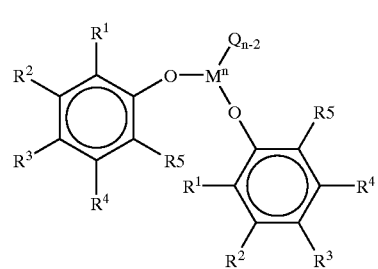

Formula (VIII)

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment, Q is a bond to any of $R^2$ to $R^5$ and the R group that Q is bound to is a heteroatom containing group.

This invention may also be practiced with the catalysts disclosed in EP 0 874 005 A1, which in incorporated by reference herein.

In a preferred embodiment the phenoxide catalyst compound comprises one or more of:
bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino) zirconium(IV) dibenzyl;
bis(N-iso-propyl-3,5-di-(1',1'-dimethylbenzyl)salicylimino) titanium(IV) dibenzyl;
bis(N-iso-propyl-3,5-di-(1',1'-dimethylbenzyl)salicylimino) hafnium(IV) dibenzyl;
bis(N-iso-butyl-3,5-di-(1',1'-dimethylbenzyl)salicylimino) zirconium(IV) dibenzyl;
bis(N-iso-butyl-3,5-di-(1',1'-dimethylbenzyl)salicylimino) zirconium(IV) dichloride;
bis(N-hexyl-3,5-di-(1',1'-dimethylbenzyl)salicylimino) zirconium(IV) dibenzyl;
bis(N-phenyl-3,5-di-(1',1'-dimethylbenzyl)salicylimino) zirconium(IV) dibenzyl;
bis(N-iso-propyl-3,5-di-(1'-methylcyclohexyl) lsalicylimino)zirconium(IV) dibenzyl;
bis(N-benzyl-3-t-butylsalicylimino)zirconium(IV) dibenzyl;
bis(N-benzyl-3-triphenylmethylsalicylimino)zirconium(IV) dibenzyl;
bis(N-iso-propyl-3,5-di-trimethylsilylsalicylimino) zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino) zircornium(IV) dibenzyl;
bis(N-benzyl-3-(2',6'-di-phenylphenyl)salicylimino) zirconium(IV) dibenzyl;
bis(N-benzyl-3-t-butyl-5-methoxysalicylimino)zirconium (IV) dibenzyl;
bis(2-(2H-benzotriazol-2-yl)-4,6-di-t-amylphenoxide) zirconium(IV) dibenzyl;
bis(2-(2H-benzotriazol-2-yl)-4,6-di-t-amylphenoxide) zirconium(IV) dichloride;
bis(2-(2H-benzotriazol-2-yl)-4,6-di-t-amylphenoxide) zirconium(IV) di(bis(dimethylamide));
bis(2-(2H-benzotriazol-2-yl)-4,6-di-(1',1'-dimethylbenzyl)phenoxide)zirconium(IV) dibenzyl;
bis(2-(2H-benzotriazol-2-yl)-4,6-di-t-amylphenoxide) titanium(IV) dibenzyl;
bis(2-(2H-benzotriazol-2-yl)-4,6-di-(1',1'-dimethylbenzyl) phenoxide)titanium(IV) dibenzyl;
bis(2-(2H-benzotriazol-2-yl)-4,6-di-(1',1'-dimethylbenzyl) phenoxide)titanium(IV) dichloride;
bis(2-(2H-benzotriazol-2-yl)-4,6-di-(1',1'-dimethylbenzyl) phenoxide)hafnium(IV) dibenzyl;
(N-phenyl-3,5-di-(1',1'-dimethylbenzyl)salicylimino) zirconium(IV) tribenzyl;
(N-(2',6'-di-iso-propylphenyl)-3,5-di-(1',1'-dimethylbenzyl) salicylimino)zirconium(IV) tribenzyl;
(N-(2',6'-di-iso-propylphenyl)-3,5-di-(1',1'-dimethylbenzyl) salicylimino)titanium(IV) tribenzyl; and (N-(2',6'-di-iso-propylphenyl)-3,5-di-(1',1'-dimethylbenzyl)salicylimino) zirconium(IV) trichloride.

D. Additional Catalyst Compounds

The catalyst compositions of the invention may include one or more complexes known as transition metal catalysts based on bidentate ligands containing pyridine or quinoline moieties, such as those described in U.S. application Ser. No. 09/103,620 filed Jun. 23, 1998, U.S. Pat. No. 6,103,657 which is herein incorporated by reference.

In one embodiment, these catalyst compounds are represented by the formula:

$$((Z)XA_t(YJ))_qMQ_n \qquad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is within the scope of this invention, in one embodiment, the catalyst compounds include complexes of $Ni^{2-}$ and $Pd^{2+}$ described in the articles Johnson, et al., "New Pd(II)- and Ni(II)- Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880, 241, which are all herein fully incorporated by reference. These complexes can be either dialkyl ether adducts, or alkylated reaction products of the described dihalide complexes that can be activated to a cationic state by the activators of this invention described below.

Other catalyst compounds include those nickel complexes described in WO 99/50313, which is incorporated herein by reference.

Also included are those diimine based ligands of Group 8 to 10 metal catalyst compounds disclosed in PCT publications WO 96/23010 and WO 97/48735 and Gibson, et al., Chem. Comm., pp. 849–850 (1998), all of which are herein incorporated by reference.

Other useful catalyst compounds are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is incorporated herein by reference.

E. Conventional Transition Metal Catalysts

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077, 904, 4,482,687, 4,564,605, 4,721,763, 4,879,359 and 4,960, 741, all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

Preferred conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, all of which are incorporated herein by reference.

It is also contemplated that other catalysts can be combined with the catalyst compounds in the catalyst composition of the invention. For example, see U.S. Pat. Nos. 4,937,299, 4,935,474, 5,281,679, 5,359,015, 5,470,811, and 5,719,241 all of which are herein fully incorporated herein reference.

It is further contemplated that one or more of the catalyst compounds described above or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

III. Activators and Activation Methods for Catalyst Compounds

The polymerization catalyst compounds, described above, are typically activated in various ways to yield compounds having a vacant coordination site that will coordinate, insert, and polymerize olefin(s). For the purposes of this patent specification and appended claims, the term "activator" is defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts.

A. Aluminoxane and Aluminum Alkyl Activators

In one embodiment, alumoxanes activators are utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206, 199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Aluminum Alkyl or organoaluminum compounds which may be utilized as activators include trimethylaluminum, triethylaluminum, triisobutylaluminum, tri-n-hexylaluminum, tri-n-octylaluminum and the like.

B. Ionizing Activators

It is within the scope of this invention to use an ionizing or stoichiometric activator, neutral or ionic, such as tri (n-butyl)ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, abandoned all of which are herein fully incorporated by reference.

In a preferred embodiment, the stoichiometric activators include a cation and an anion component, and may be represented by the following formula:

$$(L-H)_d^+ (A^{d-}) \qquad (X)$$

wherein L is an neutral Lewis base;

H is hydrogen;

$(L-H)^+$ is a Bronsted acid $A^{d-}$ is a non-coordinating anion having the charge d-d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuiran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2–6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the improved catalysts of this invention are tri-substituted ammonium salts such as:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluoropheny)borate,
N,N-diethylanilinium tetrakis(pentafluorophenyl)borate,
N,N-dimethyl-(2,4,6-trimethylanilinium)tetrakis (pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammmonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate, and
N,N-dimethyl-(2,4,6-trimethylanilinium)tetrakis-(2,3,4,6-tetrafluorophenyl)borate;
dialkyl ammonium salts such as: di-(i-propyl)ammonium tetrakis(pentafluorophenyl)borate, and dicyclohexylammonium tetrakis(pentafluorophenyl)borate; and tri-substituted phosphonium salts such as:
triphenylphosphonium tetrakis(pentafluorophenyl)borate, tri (o-tolyl)phosphonium tetrakis(pentafluorophenyl)borate, and tri(2,6-dimethylphenyl)phosphonium tetrakis (pentafluorophenyl)borate.

Most preferably, the ionic stoichiometric activator $(L-H)_d^+ (A^{d-})$ is N,N-dimethylanilinium tetra (perfluorophenyl)borate or triphenylcarbenium tetra (perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

C. Conventional-Type Cocatalysts

Typically, conventional transition metal catalyst compounds excluding some conventional-type chromium catalyst compounds are activated with one or more of the conventional cocatalysts which may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

D. Additional Activators

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate)·4THF as an activator for a bulky ligand metallocene catalyst compound. WO 99/18135, incorporated herein by reference, describes the use of organo-boron-aluminum acitivators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl) borane)benzimidazolide), which are herein incorporated by reference.

Another suitable ion forming, activating cocatalyst comprises a salt of a cationic oxidizing agent and a noncoordinating, compatible anion represented by the formula: $(OX^{e+})_d (A^{d-})_e$, wherein: $Ox^{e+}$ is a cationic oxidizing agent having a charge of e+; e is an integer from 1 to 3; and A⁻, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that catalyst compounds can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

IV. Supports, Carriers and General Supporting Techniques

The catalyst composition of the invention includes a support material or carrier, and preferably includes a supported activator. For example, the catalyst composition component, preferably the activator compound and/or the catalyst compound, is deposited on, contacted with, vaporized with, bonded to, or incorporated within, adsorbed or absorbed in, or on, a support or carrier.

A. Support Material

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the carrier of the invention typically has pore size in the range of from 10 to 1000 Å, preferably 50 to about 500 Å, and most preferably 75 to about 350 Å.

The support materials may be treated chemically, for example with a fluoride compound as described in WO 00/12565, which is herein incorporated by reference. Other supported activators are described in for example WO 00/13792 that refers to supported boron containing solid acid complex.

In a preferred method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

B. Supported Activators

In one embodiment, the catalyst composition includes a supported activator. Many supported activators are described in various patents and publications which include: U.S. Pat. No. 5,728,855 directed to the forming a supported oligomeric alkylaluminoxane formed by treating a trialkylaluminum with carbon dioxide prior to hydrolysis; U.S. Pat. No. 5,831,109 and 5,777,143 discusses a supported methylalumoxane made using a non-hydrolytic process; U.S. Pat. No. 5,731,451 relates to a process for making a supported alumoxane by oxygenation with a trialkylsiloxy moiety; U.S. Pat. No. 5,856,255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of a alumoxane impregnated support and a metallocene and a bulky aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075, 4,937,301, 5,008,228, 5,086,025, 5,147,949, 4,871,705, 5,229,478, 4,935,397, 4,937,217 and 5,057,475, and PCT WO 94/26793 all directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and a organo-aluminuim compound, which is formed by reacting aluminum trialkyl with a water containing support; U.S. Pat. No. 5,212,232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332,706, 5,473,028, 5,602,067 and 5,420,220 discusses a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbyl-alumoxane using a porous organic or inorganic imbiber material; U.S. Pat. Nos. 5,446,001 and 5,534,474 relates to a process for preparing one or more alkylaluminoxanes immobilized on a solid, particulate inert support; and EP-A1-0 819 706 relates to a process for preparing a solid silica treated with alumoxane. Also, the following articles, also fully incorporated herein by reference for purposes of disclosing useful supported activators and methods for their preparation, include: W. Kaminsky, et al., "Polymerization of Styrene with Supported Half-Sandwich Complexes", Journal of Polymer Science Vol. 37, 2959–2968 (1999) describes a process of adsorbing a methylalumoxane to a support followed by the adsorption of a metallocene; Junting Xu, et al. "Characterization of isotactic polypropylene prepared with dimethylsilyl bis(1-indenyl)zirconium dichloride supported on methylaluminoxane pretreated silica", European Polymer Journal 35 (1999) 1289–1294, discusses the use of silica treated with methylalumoxane and a metallocene; Stephen O'Brien, et al., "EXAFS analysis of a chiral alkene polymerization catalyst incorporated in the mesoporous silicate MCM-41" Chem. Commun. 1905–1906 (1997) discloses an immobilized alumoxane on a modified mesoporous silica; and F. Bonini, et al., "Propylene Polymerization through Supported Metallocene/MAO Catalysts: Kinetic Analysis and Modeling" Journal of Polymer Science, Vol. 33 2393–2402 (1995) discusses using a methylalumoxane supported silica with a metallocene. Any of the methods discussed in these references are useful for producing the supported activator component utilized in the catalyst composition of the invention and all are incorporated herein by reference.

In another embodiment, the supported activator, such as supported alumoxane, is aged for a period of time prior to use herein. For reference please refer to U.S. Pat. Nos. 5,468,702 and 5,602,217, incorporated herein by reference.

In an embodiment, the supported activator is in a dried state or a solid. In another embodiment, the supported activator is in a substantially dry state or a slurry, preferably in a mineral oil slurry.

In another embodiment, two or more separately supported activators are used, or alternatively, two or more different activators on a single support are used.

In another embodiment, the support material, preferably partially or totally dehydrated support material, preferably 200° C. to 600° C. dehydrated silica, is then contacted with an organoaluminum or alumoxane compound. Preferably in an embodiment where an organoaluminum compound is used, the activator is formed in situ on and in the support material as a result of the reaction of, for example, trimethylaluminum and water.

In another embodiment, Lewis base-containing supports are reacted with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, U.S. Pat. No. 6,147,173 which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In a preferred embodiment, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138kPa). An inert gas sweep can also be used in assist in removing solvent. Alternate orders of addition, such as slurrying the support material in an appropriate solvent then adding the activator, can be used.

C. Spray Dried Catalyst Composition Components

In another embodiment a support is combined with one or more activators and is spray dried to form a supported activator. In a preferred embodiment, fumed silica is combined with methyl alumoxane and then spray dried to from supported methyl alumoxane. Preferably a support is combined with alumoxane, spray dried and then placed in mineral oil to form a slurry useful in the instant invention.

In another embodiment, the catalyst compounds described above have been combined with optional support material(s) and or optional activator(s) and spray dried prior to being combined with the slurry diluent.

In another embodiment, the catalyst compounds and/or the activators are preferably combined with a support material such as a particulate filler material and then spray dried, preferably to form a free flowing powder. Spray drying may be by any means known in the art. Please see EP A 0 668 295 B1, U.S. Pat. No. 5,674,795 and U.S. Pat. No. 5,672,669 and U.S. patent application Ser. No. 09/464,114 filed Dec. 16, 1999, U.S. Pat. No. 6,281,306 which particularly describe spray drying of supported catalysts. In general one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5 to 8 wt %. This formulation may sit as a slurry for as long as 30 minutes with mild stirring or manual shaking to keep it as a suspension before spray-drying. In one preferred embodiment, the makeup of the dried material is about 40–50 wt % activator (preferably alumoxane), 50–60 $SiO_2$ and about~2 wt % catalyst compound.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 vol % can be present in the activator/filler mixture prior to the addition of the first metal catalyst compound.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

In another embodiment a solution of a bulky ligand metallocene compound and optional activator can be combined with a different slurried spray dried catalyst compound and then introduced into a reactor.

The spray dried particles are generally fed into the polymerization reactor as a mineral oil slurry. Solids concentrations in oil are about 10 to 30 weight %, preferably 15 to 25 weight %. In some embodiments, the spray dried particles can be from less than about 10 micrometers in size up to about 100 micrometers, compared to conventional supported catalysts which are about 50 micrometers. In a preferred embodiment the support has an average particle size of 1 to 50 microns, preferably 10 to 40 microns.

V. Catalyst Compositions of the Invention

To prepare the catalyst composition of the invention, the catalyst components described above are utilized in a catalyst component slurry and/or in a catalyst component solution. For the purposes of this invention, a slurry is defined to be a suspension of a solid, where the solid may or may not be porous, in a liquid. The catalyst component slurry and the catalyst component solution are combined to form the catalyst composition which is then introduced into a polymerization reactor.

A. Catalyst Component Slurry

In one embodiment, the catalyst component slurry includes an activator and a support, or a supported activator. In another embodiment, the slurry also includes a catalyst compound in addition to the activator and the support and/or the supported activator. In one embodiment, the catalyst compound in the slurry is supported.

In another embodiment, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compounds. Preferably, the slurry comprises a supported activator and two catalyst compounds.

In another embodiment the slurry comprises supported activator and two different catalyst compounds, which may be added to the slurry separately or in combination.

In another embodiment the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react.

In another embodiment the molar ratio of metal in the activator to metal in the catalyst compound in the slurry is 1000:1 to 0.5:1, preferably 300:1 to 1:1, more preferably 150:1 to 1:1.

In another embodiment the slurry contains a support material which may be any inert particulate carrier material known in the art, including, but not limited to, silica, fumed silica, alumina, clay, talc or other support materials such as disclosed above. In a preferred embodiment, the slurry contains a supported activator, such as those disclosed above, preferably methyl alumoxane and/or modified methyl alumoxane on a support of silica.

The catalyst component slurry used in the process of this invention is typically prepared by suspending the catalyst components, preferably the support, the activator and optional catalyst compounds in a liquid diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert. The concentration of the components in the slurry is controlled such that a desired ratio of catalyst compound(s) to activator, and/or catalyst compound to catalyst compound is fed into the reactor.

Typically, the catalyst compound and the support and activator, or supported activator, and the slurry diluent are allowed to contact each other for a time sufficient for at least 50% of the catalyst compounds to be deposited into or on the support, preferably at least 70%, preferably at least 75%, preferably at least 80%, more preferably at least 90%, preferably at least 95%, preferably at least 99%. In an embodiment, the catalyst component slurry is prepared prior to its use in the catalyst feed system of the invention. Times allowed for mixing are up to 10 hours, typically up to 6 hours, more typically 4 to 6 hours. In one embodiment of this invention a catalyst compound will be considered to be in or on the support if the concentration of the catalyst compound in the liquid portion of the slurry is reduced over time after adding the catalyst compound to the slurry. Concentration of the catalyst compound in the liquid diluent may be measured for example, by inductively coupled plasma spectroscopy (ICPS), or by ultraviolet (WV) spectroscopy, after standardization with a calibration curve prepared at the appropriate concentration range, as is known in the art. Thus for example, 70% of a catalyst compound will be considered to have deposited in or on a support if the concentration of the catalyst compound in the liquid (not including the support) is reduced by 70% from its initial concentration.

In one embodiment, the catalyst compounds can be added to the slurry as a solution, slurry, or powder. The catalyst component slurry is prepared prior to its use in the polymerization process of the invention or the catalyst component slurry may be prepared in-line.

In one embodiment, the slurry is prepared by combining the catalyst components, such as for example the catalyst or supported catalyst and the support and activator or supported activator, all at once. In another embodiment, the slurry is prepared by first adding a support material, then adding the combination of a catalyst and an activator component.

In another embodiment the slurry comprises a supported activator and at least one catalyst compound where the catalyst compound is combined with the slurry as a solution. A preferred solvent is mineral oil.

In a another embodiment, alumoxane, preferably methyl alumoxane or modified methyl alumoxane, is combined with a support such as calcined silica or fumed silica to form a supported activator, the supported activator is then dispersed in a liquid, such as degassed mineral oil, and then one or more catalyst compounds are added to the dispersion and mixed to form the catalyst component slurry. The catalyst compounds are preferably added to the dispersion as a solid, powder, solution or a slurry, preferably a slurry of mineral oil. If more than one catalyst compound is added to the dispersion, the catalyst compounds can be added sequentially, or at the same time.

In another embodiment the catalyst compound is added to the slurry in solid or powder form. In a preferred embodiment, a Group 15 containing catalyst compound is added to the slurry in powder or solid form. In another preferred embodiment, $[(2,4,6\text{-Me}_3\text{C}_6\text{H}_2)\text{NCH}_2\text{CH}_2]_2\text{NHZrBz}_2$ and or $[(2,4,6\text{-Me}_3\text{C}_6\text{H}_2)\text{NCH}_2\text{CH}_2]_2\text{NHHfBz}_2$ is added to the slurry as a powder.

In a preferred embodiment the catalyst component slurry comprises mineral oil and has a viscosity of about 130 to about 2000 cP at 20° C., more preferably about 180 to about 1500 cP at 20° C. and even more preferably about 200 to about 800 cP at 20° C. as measured with a Brookfield model LVDV-III Rheometer housed in a nitrogen purged drybox (in such a manner that the atmosphere is substantially free of moisture and oxygen, i.e. less than several ppmv of each). The catalyst component slurries are made in a nitrogen purged drybox, and rolled in their closed glass containers until immediately before the viscosity measurements are made, in order to ensure that they are fully suspended at the start of the trial. Temperature of the viscometer is controlled via an external temperature bath circulating heat transfer fluid into the viscometer. The rheometer was fitted with the appropriate spindle for the test material as specified in the unit's application guide. Typically, a SC4-34 or SC4-25 spindle was used. Data analysis was performed using Rheocalc V1.1 software, copyright 1995, Brookfield Engineering Laboratories, preferably purchased and used with the unit.

In one embodiment, the catalyst component slurry comprises a supported activator and one or more or a combination of the catalyst compound(s) described in Formula I to IX above.

In another embodiment, the catalyst component slurry comprises a supported activator and one or more or a combination of the Group 15 catalyst compound(s) represented by Formula I or II described above.

In another embodiment, the catalyst component slurry comprises a supported activator and one or more or combination of the bulky ligand catalyst compound(s) represented by Formula III to VI described above.

In another embodiment, the slurry comprises supported activator, a Group 15 catalyst compound(s) represented by Formula I or II described above, and a the bulky ligand catalyst compound(s) represented by Formula III to VI In another embodiment, the slurry comprises supported alumoxane and $[(2,4,6\text{-Me}_3\text{C}_6\text{H}_2)\text{NCH}_2\text{CH}_2]_2\text{NH MBz}_2$ where M is a Group 4 metal, each Bz is a independently a benzyl group and Me is methyl.

In another embodiment, the slurry comprises a supported alumoxane, a Group 15 catalysts compound and one of the following: bis(n-propyl cyclopentadienyl)-$MX_2$, (pentamethylcyclopentadienyl)(n-propyl cyclopentadienyl) $MX_2$, bis(indenyl)-$MX_2$, or (tetramethylcyclopentadienyl)(n-propyl cyclopentadienyl)$MX_2$, where M is zirconium, hafnium or titanium and X is chlorine, bromine, or fluorine.

In the polymerization process of the invention, described below, any of the above described catalyst component containing slurries may be combined with any of the catalyst component containing solutions described below. In addition, more than one catalyst component containing slurry may be utilized.

B. Catalyst Component Solution

In one embodiment, the catalyst component solution includes a catalyst compound. In another embodiment, the solution also includes an activator in addition to the catalyst compound.

The solution used in the process of this invention is typically prepared by dissolving the catalyst compound and optional activators in a liquid solvent. The liquid solvent is typically an alkane, such as a $C_5$ to $C_{30}$ alkane, preferably a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

In a preferred embodiment the ratio of metal in the activator to metal in the catalyst compound in the solution is 1000:1 to 0.5:1, preferably 300:1 to 1:1, more preferably 150:1 to 1:1.

In a preferred embodiment, the activator and catalyst compound is present in the solution at up to about 90 wt %, preferably at up to about 50 wt %, preferably at up to about 20 wt %, preferably at up to about 10 wt %, more preferably at up to about 5 wt %, more preferably at less than 1 wt %, more preferably between 100 ppm and 1 wt % based upon the weight of the solvent and the activator or catalyst compound.

In one embodiment, the catalyst component solution comprises any one of the catalyst compounds described in Formula I to IX above.

In another embodiment, the catalyst component solution comprises a Group 15 catalyst compound represented by Formula I or II described above.

In another embodiment, the catalyst component solution comprises a bulky ligand catalyst compound represented by Formula III to VI described above.

In a preferred embodiment the solution comprises bis(n-propyl cyclopentadienyl)-$MX_2$, (pentamethylcyclopentadienyl)(n-propylcyclopentadienyl) $MX_2$, bis(indenyl)-$MX_2$, (tetramethylcyclopentadienyl)(n-propylcyclopentadienyl) $MX_2$, where M is a Group 4 metal, preferably zirconium, hafnium or titanium and X is chlorine, bromine, or fluorine.

In the polymerization process of the invention, described below, any of the above described catalyst component containing solution(s) may be combined with any of the catalyst component containing slurry/slurries described above. In addition, more than one catalyst component containing solution may be utilized.

C. Catalyst Compositions

The catalyst composition of the invention is formed by combining any one of the catalyst component slurries with any one of the catalyst component solutions described above. Generally, the catalyst component slurry and the catalyst component solution are mixed in the process of the invention to form the final catalyst composition, which is then introduced into a polymerization reactor and combined with and one or more olefins.

In one embodiment, the slurry contains at least one support and at least one activator, preferably a supported activator, and the solution contains at least one catalyst compound.

In another embodiment, the catalyst component slurry contains a support, and an activator and/or a supported activator, and the catalyst component solution contains at least one catalyst compound and at least one activator.

In one embodiment, the slurry contains at least one support and at least one activator, preferably a supported activator, and the solution contains one or more catalyst compound(s) and/or one or more activator compound(s).

In another embodiment, the catalyst component slurry contains more than one support(s), activator(s) and/or supported activator(s), and the catalyst component solution contains at least one catalyst compound.

In another embodiment, the catalyst component slurry contains more than one support(s), activator(s) and/or supported activator(s), and the catalyst component solution contains at least one catalyst compound and at least one activator.

In another embodiment, the catalyst component slurry contains more than one support(s), activator(s) and/or supported activator(s), and the catalyst component solution contains one or more catalyst compound(s) and/or one or more activator compound(s).

In another embodiment, the catalyst component slurry contains a support, an activator and/or a supported activator, and also contains a catalyst compound and/or a supported catalyst compound, and the catalyst component solution contains at least one catalyst compound.

In another embodiment, the catalyst component slurry contains a support, an activator and/or a supported activator, and also contains a catalyst compound and/or a supported catalyst compound, and the catalyst component solution contains at least one catalyst compound and at least one activator.

In another embodiment, the catalyst component slurry contains a support, an activator and/or a supported activator, and also contains a catalyst compound and/or a supported catalyst compound, and the catalyst component solution contains one or more catalyst compound(s) and/or one or more activator compound(s).

In another embodiment, the catalyst component slurry contains a support, an activator and/or a supported activator and more than one catalyst compound(s) and/or supported catalyst compounds, and the catalyst component solution contains at least one catalyst compound.

In another embodiment, the catalyst component slurry contains a support, an activator and/or a supported activator and more than one catalyst compound(s) and/or supported catalyst compounds, and the catalyst component solution contains at least one catalyst compound and at least one activator.

In another embodiment, the catalyst component slurry contains a support, an activator and/or a supported activator and more than one catalyst compound(s) and/or supported catalyst compounds, and the catalyst component solution contains one or more catalyst compound(s) and/or one or more activator compound(s).

In another embodiment, the catalyst component slurry contains more than one support(s), activator(s) and/or supported activators and more than one catalyst compound(s) and/or supported catalyst compound(s), and the catalyst component solution contains at least one catalyst compound.

In another embodiment, the catalyst component slurry contains more than one support(s), activator(s) and/or supported activators and more than one catalyst compound(s) and/or supported catalyst compound(s), and the catalyst component solution contains at least one catalyst compound and at least one activator.

In another embodiment, the catalyst component slurry contains more than one support(s), activator(s) and/or supported activators and more than one catalyst compound(s) and/or supported catalyst compound(s), and the catalyst component solution contains one or more catalyst compound(s) and/or one or more activator compound(s).

In one embodiment the catalyst composition, formed by combining the catalyst component slurry and the catalyst component solution, has a viscosity of about 130 to about 2000 cP at 20° C., more preferably about 180 to about 1500 cP at 20° C. even more preferably about 200 to about 800 cP at 20° C.

In another embodiment, the catalyst component solution comprises, up to 80 weight %, preferably up to 50 weight %, preferably up to 20 weight %, preferably up to 15 weight %, more preferably between 1 to 10 weight %, more preferably 3 to 8 weight % of the combination of the catalyst component solution and the catalyst component slurry, based upon the weight of the solution and the slurry. In another preferred embodiment, the catalyst component solution comprises mineral oil and comprises up to 90 weight %, preferably up to 80 weight %, more preferably between 1 to 50 weight %, and more preferably 1 to 20 weight % of the combination of the catalyst component solution and the catalyst component slurry, based upon the weight of the solution and the slurry.

In one embodiment, the catalyst component slurry is fed to the polymerization reactor utilizing a slurry feeder. In another embodiment the catalyst composition is fed to the polymerization reactor utilizing a slurry feeder. A slurry feeder, for example, is described U.S. Pat. No. 5,674,795, incorporated herein by reference.

In one embodiment, the catalyst component solution, comprising a catalyst compound, is contacted with the catalyst component slurry so that at least 50% of the catalyst compound originally in the catalyst component solution is deposited in or on the support, preferably at least 70%, preferably at least 75%, preferably at least 80%, more preferably at least 90%, preferably at least 95%, preferably at least 99%.

In another embodiment, the catalyst component solution comprising a metallocene catalyst compound, is contacted with a catalyst component slurry comprising a support and an activator, preferably a supported activator, to form an immobilized catalyst composition. After contacting, all or substantially all, preferably at least 50% preferably at least 70%, preferably at least 75%, preferably at least 80%, more preferably at least 90%, preferably at least 95%, preferably at least 99% of the catalyst compound from the catalyst component solution is deposited in or on the support initially contained in the catalyst component slurry. In one embodiment, a catalyst compound will be considered to be in or on the support if the concentration of the catalyst compound in the liquid portion of the combination is reduced over time after adding the catalyst compound from the solution. The catalyst concentration may be measured as described above.

In another embodiment, the supported activator is in a mineral oil that is then contacted with a metallocene catalyst solution prior to introducing the catalyst composition to the reactor, preferably where the contacting takes place in-line.

In another embodiment, the immobilized catalyst composition system or components thereof may be contacted with a carboxylate metal salt as described in PCT publication WO 00/02930 and WO 00/02931, which are herein incorporated by reference.

In another embodiment the solution comprises a catalyst compound and the slurry comprises a supported activator, such as supported alumoxane, and two or more catalyst compounds, that may be the same or different from the catalyst compound in the solution. The two catalyst compounds may be added to the slurry before or after the supported activator. In a preferred embodiment the supported activator is added to the liquid diluent first to form a slurry, then a catalyst compound is added to the slurry, and thereafter another catalyst compound is added to the slurry. The second catalyst is preferably added after the first catalyst compound and the supported activator have been contacted for at least 1 minute, preferably at least 15 minutes, more preferably at least 30 minutes, more preferably at least 60 minutes, more preferably at least 120 minutes, more preferably at least 360 minutes.

In another embodiment the two catalyst compounds are added to the slurry at the same time, in the same or different solutions. In another embodiment, a catalyst compound is contacted with an unsupported activator prior to being placed in the slurry. In a preferred embodiment, the unsupported activator is a modified or unmodified alumoxane, such as methyl alumoxane.

In another embodiment, the catalyst compound may be added to the solution or slurry in its constituent parts of metal compound and ligands. For example, cyclopentadienyl groups such as substituted or unsubstituted cyclopentadiene, indene, fluorene groups and metal compounds such as zirconium tetrahalide may be added to the slurry or solution or both and allowed to react therein. Likewise, one may also add metal compounds and or ligands to the solution and or slurry that already contains catalyst compounds. The metal compounds and ligands may be the same or different from the components of the catalyst compound in the solution or slurry. In another embodiment ligands and/or metal compounds may be added to both the solution and the slurry.

In another embodiment the catalyst composition comprises a "bisamide" catalyst compound (i.e., a bridged bis(arylamido) Group 4 compounds described by D. H. McConville, et al., in Organometallics 1195, 14, 5478–5480, or a bridged bis(amido) catalyst compounds described in WO 96/27439) combined with an activator, spray dried to a powder state, then combined with mineral oil to form a slurry. This combination may then be combined with various catalyst component solutions to form a particularly effective multiple catalyst systems. Preferred catalyst compounds include those described above as bulky ligand metallocene catalysts. In another preferred embodiment the slurry comprises a supported activator and the solution comprises a catalyst compound. The catalyst compounds may be selected from various catalyst compounds described above including bulky ligand metallocenes.

In another embodiment, the slurry comprises [(2,4,6-$Me_3C_6H_2$) $NCH_2CH_2]_2NHZrBz_2$ or [(2,4,6-$Me_3C_6H_2$) $NCH_2CH_2]_2NHHfBz_2$, where each Bz is independently a benzyl group, Me is methyl, and the solution comprises bis(n-propyl cyclopentadienyl)-$MX_2$, (pentamethylcyclopentadienyl)(n-propylcyclopentadienyl) $MX_2$, bis(indenyl)-$MX_2$, or (tetramethylcyclopentadienyl) (n-propylcyclopentadienyl) $MX_2$, where M is zirconium, hafnium or titanium and X is chlorine, bromine, or fluorine.

In another embodiment, the solution comprises [(2,4,6-$Me_3C_6H_2$) $NCH_2CH_2]_2NHZrBz_2$ or [(2,4,6-$Me_3C_6H_2$) $NCH_2CH_2]_2NHHfBz_2$, where each Bz is independently a benzyl group, Me is methyl, and the slurry comprises: 1) supported alumoxane, and 2) bis(n-propyl cyclopentadienyl)-$MX_2$, pentamethylcyclopentadienyl)(n-propylcyclopentadienyl)$MX_2$, bis(indenyl)-$MX_2$, or (tetramethylcyclopentadienyl) (n-propylcyclopentadienyl) $MX_2$, where M is zirconium, hafnium or titanium and X is chlorine, bromine, or fluorine.

In another embodiment, the slurry comprises: 1) a supported alumoxane, 2) bis(n-propyl cyclopentadienyl)-$MX_2$, (pentamethylcyclopentadienyl)(n-propyl-cyclopentyldienyl)$MX_2$, bis(indenyl)-$MX_2$, (tetramethylcyclopentadienyl) (n-propylcyclopentadienyl) $MX_2$, where M is zirconium, hafnium or titanium and X is chlorine, bromine, or fluorine, and 3) [(2,4,6-$Me_3C_6H_2$) $NCH_2CH_2]_2NHZrBz_2$ or [(2,4,6-$Me_3C_6H_2$)$NCH_2CH_2]_2NHHfBz_2$, and the solution comprises a bulky ligand metallocene compound.

In another embodiment, the slurry comprises mineral oil and a spray dried catalyst compound. In another embodiment, the spray dried catalyst compound is a Group 15 containing metal compound. In a preferred embodiment, the spray dried catalyst compound comprises [(2,4,6-$Me_3C_6H_2$)$NCH_2CH_2]_2NHZrBz_2$.

In another embodiment, the catalyst compound and the supported activator may be combined before being combined with the slurry diluent or after.

In another embodiment the solution comprises a catalyst compound of bis-indenyl zirconium dichloride, bis(n-propyl cyclopentadienyl)zirconium dichloride, (pentamethylcyclopentadienyl.(n-propylcyclopentadienyl) zirconium dichloride, (tetramethylcyclopentadienyl)(n-propylcyclopentadienyl)zirconium dichloride, or a mixture thereof.

In another embodiment, a first catalyst compound is combined with a supported activator in the slurry, and a second catalyst compound and an activator are combined in the solution and thereafter the two are mixed in line. In another embodiment, the one activator is an alumoxane and the other activator is a boron based activator.

In another embodiment the slurry comprises mineral oil, spray dried [(2,4,6-$Me_3C_6H_2$)$NCH_2CH_2]_2NHZrBz_2$, and the solution comprises bis(n-propyl cyclopentadienyl) zirconium dichloride.

In a one embodiment of this invention the slurry comprises supported activator and a catalyst compound and the solution comprises a catalyst compound different in some way from the catalyst compound in the slurry. For example, the slurry catalyst compound could be a compound represented by the Formula I or II described above, while the solution catalyst compound could be a catalyst compound described by Formula III, IV, V, VI, or VII, or vice versa.

In another embodiment, if a bimodal polymer product were desired, one could mix a first catalyst compound with an activator in the slurry, then on-line add a solution of a different catalyst compound that is capable of being activated by the same activator. Since the two catalyst compounds are introduced into the feed line independently, it will be easier to control the amount of the two species in the final bimodal product, assuming that each catalyst produces at least one species of polymer.

In another embodiment, a Group 15 metal containing compound and a bulky ligand metallocene catalyst compound are combined with supported alumoxane in the process of this invention. Typically the two catalyst compounds are combined in the slurry with the supported alumoxane and the solution will comprise a trim solution of one or the other of the two catalyst compounds.

In another embodiment, [(2,4,6-Me$_3$C$_6$H$_2$)NCH$_2$CH$_2$]$_2$NHHfBz$_2$, and bis(n-propyl cyclopentadienyl)zirconium dichloride are combined with supported methyl alumoxane in the process of this invention. Typically the two catalyst compounds are combined in the slurry with the supported alumoxane and the solution will comprise one or the other of the two catalyst compounds. The solution is preferably used as a trim solution to regulate the product formed in the reactor by varying the amount of solution combined with the slurry on-line, i.e. to trim the mix. In one embodiment this catalyst combination is then used to polymerize olefin(s), preferably ethylene, at a polymerization temperature of 80 to 110° C. and in the presence of little or no comonomer(s) for example hexene.

In another embodiment the slurry concentration is maintained at greater than 0 to 90 wt % solids, more preferably 1 to 50 wt %, more preferably 5 to 40 wt %, even more preferably 10 to 30 wt %, based upon the weight of the slurry. In another preferred embodiment the activator is present on the support at between about 0.5 to about 7 mmol/g, preferably about 2 to about 6 mmol/g, more preferably between about 4 to about 5 mmol/g. In another preferred embodiment the total amount of catalyst compound present on the support, preferably a supported activator, is about 1 to about 40 $\mu$mol/g, preferably about 10 to about 38 $\mu$mol/g, more preferably 30 to 36 $\mu$mol/g.

In one embodiment the final mole ratio (i.e. after combination of the solution and the slurry) of the metal of the catalyst compounds and the metal of the activator is in the range of from about 1000:1 to about 0.5:1 preferably from about 300:1 to about 1:1 more preferably from about 150:1 to about 1:1; for boranes, borates, aluminates, etc., the ratio is preferably about 1:1 to about 10:1 and for alkyl aluminum compounds (such as diethylaluminum chloride combined with water) the ratio is preferably about 0.5:1 to about 10:1.

In one embodiment, the catalyst compound used in the slurry is not soluble in the solvent used in the solution. By "not soluble" is meant that the not more than 5 weight % of the material dissolves into the solvent at 20 ° C. and less than 3 minutes of stirring, preferably not more than 1 weight %, preferably not more than 0.1 weight %, preferably not more than 0.01 weight %. In a preferred embodiment, the catalyst compound used in the slurry at least only sparingly soluble in an aromatic hydrocarbon. In a particularly preferred embodiment the catalyst compound used in the slurry is not soluble in mineral oil, aromatic solvent or aliphatic hydrocarbon (pentane, heptane, etc.).

D. Delivery of the Catalyst Composition

In the process of the invention, the catalyst component slurry is combined with and/or reacted with the catalyst component solution to form a catalyst composition in-line. The catalyst composition so formed is then is introduced into the polymerization reactor. Generally the catalyst composition is introduced to the reactor utilizing a catalyst feed system which includes a catalyst component slurry holding vessel, a catalyst component solution holding vessel, and a slurry feeder.

Referring to FIG. 1, in one embodiment, the catalyst component slurry, preferably a mineral oil slurry including at least one support and at least one activator, preferably at least one supported activator, and optional catalyst compound(s) is placed in a vessel (A). In a preferred embodiment (A) is an agitated holding tank designed to keep the solids concentration homogenous. The catalyst component solution, prepared by mixing a solvent and at least one catalyst compound and/or activator, is placed in a vessel (C). The catalyst component slurry is then combined in-line with the catalyst component solution to form a final catalyst composition. A nucleating agent, such as silica, alumina, fumed silica or any other particulate matter (B) may be added to the slurry and/or the solution in-line or in the vessels (A) or (C). Similarly, additional activators or catalyst compounds may be added in-line. The catalyst component slurry and solution are preferably mixed in-line at some point (E) for a period of time. For example, the solution and slurry may be mixed by utilizing a static mixer or an agitating vessel. The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination thereby becomes a uniform dispersion of catalyst compounds on the supported activator forming the catalyst composition of the invention. The length of time that the slurry and the solution are contacted is typically up to about 120 minutes, preferably about 1 to about 60 minutes, more preferably about 5 to about 40 minutes, even more preferably about 10 to about 30 minutes.

In another embodiment, an aluminum alkyl, an ethoxylated aluminum alkyl, an alumoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl alumoxane, ethyl alumoxane, isobutylalumoxane, modified alumoxane or the like are added to the mixture of the slurry and the solution in line. The alkyls, antistatic agents, borate activators and/or alumoxanes may be added (F), directly to the combination of the solution and the slurry, or may be added via an additional alkane (such as isopentane, hexane, heptane, and or octane) carrier stream (G). Preferably, the additional alkyls, antistatic agents, borate activators and/or alumoxanes are present at up to about 500 ppm, more preferably at about 1 to about 300 ppm, more preferably at 10 to about 300 ppm, more preferably at about 10 to about 100 ppm. Preferred carrier streams include isopentane and or hexane. The alkane may be added (G) to the mixture of the slurry and the solution, typically at a rate of about 0.5 to about 60 lbs/hr (27 kg/hr). Likewise carrier gas, such as nitrogen, argon, ethane, propane and the like may be added in-line (H) to the mixture of the slurry and the solution. Typically the carrier gas may be added at the rate of about 1 to about 100 lb/hr (0.4 to 45 kg/hr), preferably about 1 to about 50 lb/hr (5 to 23 kg/hr), more preferably about 1 to about 25 lb/hr (0.4 to 11 kg/hr).

In another embodiment, a liquid carrier stream is introduced into the combination of the solution and slurry that is moving in a downward direction. The mixture of the solution, the slurry and the liquid carrier stream may pass through an optional mixer or length of tube for mixing before being contacted with a gaseous carrier stream.

Similarly, hexene (or other alpha-olefin or diolefin) may be added in-line (J) to the mixture of the slurry and the solution. The slurry/solution mixture is then preferably passed through an injection tube (O) to the reactor (Q). In some embodiments, the injection tube may aerosolize the slurry/solution mixture. In a preferred embodiment the injection tube has a diameter of about 1/16 inch to about 1/2 inch (0.16 cm to 1.27 cm), preferably about 3/16 inch to about 3/8 inch (0.5 cm to 0.9 cm), more preferably 1/4 inch to about 3/8ths inch (0.6 cm to 0.9 cm).

In one embodiment cycle gas (also called re-cycle gas) is introduced into the support tube (S), in another embodiment monomer gas, such as ethylene gas, is introduced into the support tube. Nucleating agents (K), such as fumed silica, can be added directly in to the reactor.

In another embodiment a plenum may be used in this invention. A plenum is a device used to create a particle lean zone in a fluidized bed gas-phase reactor, as described in detail in U.S. Pat. No. 5,693,727 which is incorporated herein by reference. A plenum may have one, two, or more injection nozzles.

In another embodiment when a metallocene catalyst or other similar catalyst is used in the gas phase reactor, oxygen and or fluorobenzene can be added to the reactor directly or to the recycle gas to affect the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propyl cyclopentadienyl)zirconium dichloride and [(2,4,6-Me$_3$C$_6$H$_2$)NCH$_2$CH$_2$]$_2$NHZrBz$_2$, where Me is methyl or bis(indenyl)zirconium dichloride and [(2,4,6-Me$_3$C$_6$H$_2$)NCH$_2$CH$_2$]$_2$NHHfBz$_2$, where Me is methyl. For example if the oxygen concentration in the nitrogen feed is altered from 0.1 ppm to 0.5 ppm, significantly less polymer from the bisindenyl ZrCl$_2$ will be produced and the relative amount of polymer produced from the [(2,4,6-Me$_3$C$_6$H$_2$)NCH$_2$CH$_2$]$_2$ NHHfBz$_2$ is increased. WO/09328 discloses the addition of water and or carbon dioxide to gas phase polymerization reactors.

In another embodiment, referring still to FIG. 1, the slurry comprising mineral oil, at least one catalyst compound, a support and an activator is mixed in and/or introduced from (A). The catalyst component solution comprising a solvent, such as toluene, hexane, mineral oil or tetrahydrofuran, and a catalyst compound and/or an activator is mixed in and/or introduced from (C). Nucleating agent (B) and (K), such as fumed silica, may be added on line at one or more positions and may be wet or dry. The slurry and the solution are combined and typically mixed at (E). Optional light alkyls (F), such as triisobutyl aluminum, an alumoxane, modified methylalumoxane and/or trimethyl aluminum, may be added in line directly to the combination or via an alkane, such as isopentane, feed (G). Nitrogen (H) and/or olefin, such as hexene, (J) may also be added in line. The combination may then be injected through an injection tube (O) (such as a 1/8 inch (0.3cm) tube) into a gas phase reactor (Q). The injection tube (O) may be supported inside a larger support tube (S), such as a 1 inch (2.54 cm) tube. Oxygen can be added directly to the reactor (Q) or to the recycle gas (P) to alter the activity of one or more catalysts. (R) is flow (monomer, recycle gas, alkane) to the support tube (S).

In another embodiment, catalyst ball formation and or general nozzle fouling were reduced by first feeding isopentane carrier from the feed line (G) into the combination of the solution and the slurry, thereafter the combination of the solution slurry and isopentane preferably moves in a vertical orientation with a downward flow into the reactor using a nitrogen sweep (H) to disperse the isopentane/slurry mixture into the reactor.

The catalyst injection tube passes into the reactor through a compressed chevron packing and extends into the fluid bed a distance of about 0.1 inch to 10 feet (0.25 cm to 3.1 m), preferably about 1 inch to 6 ft (2.5 cm to 1.8 m), and more preferably about 2 inches to 5 feet (5 cm to 1.5 m). Typically, the depth of insertion depends on the diameter of the reactor and typically extends in about 1/20 to 1/2 of the reactor diameter, preferably about 1/10th to 1/2 and more preferably about 1/5th to 1/3rd of the reactor diameter. The end of the tube may be cut perpendicular to the axis to create a nozzle cone or point with an angle ranging from 0 to 90 degrees, preferably ranging from about 10 to 80 degrees. The lip of the hole can be taken to a new knife-edge. The tube can be positioned to reduce resin adhesion or coated with an antifouling or antistatic compound. The tube can also be cut diagonally at an angle simply from about 0 to 80 degrees off the axial line of the tube, preferably about 0 to 60 degrees. The opening of the tube can be the same as the bore of the tube or expanded or diminished to create a nozzle, with sufficient pressure drop and geometry to provide a dispersed spray of a solution slurry and or powder into the reactor, preferably into the fluid bed.

The injection tube can optionally be supported inside a structure within the fluid bed to provide structural integrity. This support tube is typically a heavy walled pipe with an internal diameter of from about 1/4 inch to about 5 inches (0.64 cm to 12.7 cm), preferably about 1/2 inch to about 3 inches (1.3 cm to 7.6 cm), and more preferably about 3/4 inch to about 2 inches (1.9 cm to 5 cm). The support tube preferably extends through the reactor wall to approximately the length of the injection tube, allowing the injection tube to end just inside the end of the support tube or to extend past it up to about 10 inches (25.4 cm). Preferably, the injection tube extends about 0.5 to 5 inches (1.8 cm to 12.7 cm) beyond the end of the support tube and more preferably about 1 to 3 inches (2.5 cm to 7.6 cm). The end of the support tube in the reactor may be cut flat and perpendicular to the axis of the tube or preferably, may be tapered at an angle ranging from about 10 to 80 degrees. The end of the support tube may be polished or coated with an anti-static or anti-fouling material.

A purge flow of fluid (R) (typically fresh monomer, ethylene, hexane, isopentane, recycle gas, and the like) is preferably introduced from outside the reactor down the support tube to aid in dispersion of the catalyst composition allowing the production of resin granular particles of good morphology with decreased agglomeration and an APS (average particle size) in the range of about 0.005 to 0.10 inches (0.01 cm to 0.3 cm). The purge flow of fluid helps minimize fouling of the end of the catalyst injection tube and support tubes. The fluid introduced to the support tube may comprise hydrogen; olefins or diolefins, including but not limited to $C_2$ to $C_{40}$ alpha olefins and $C_2$ to $C_{40}$ diolefins, ethylene, propylene, butene, hexene, octene, norbomene, pentene, hexadiene, pentadiene, isobutylene, octadiene, cyclopentadiene, comonomer being used in the polymerization reaction, hydrogen; alkanes, such $C_1$ to $C_{40}$ alkanes, including but not limited to isopetane, hexane, ethane, propane, butane, and the like; mineral oil, cycle gas with or without condensed liquids; or any combination thereof. Preferably the support tube flow is fresh ethylene or propylene that may be heated. In addition, an alkane, such as for instance isopentane or hexane, can be included in the flow at the level ranging from about 0.001 wt %. to about 50% of the flow. The alkane can be dispersed in the flow and may exist as dispersed liquid droplets or be vaporized at the exit of the support tube. The presence of liquid may reduce fouling at the exit.

The flow rate of fluid in the support tube ranges from about 5 to 10,000 pph and is somewhat dependent upon the reactor size. The linear velocity of the fluid in the support tube ranges from about 10 to 500 ft/sec (11 to 549 km/hr), preferably about 20 to 300 ft/sec (22 to 329 km/hr) and more preferably about 30 to 200 ft/sec (33 to 219 km/hr).

Alternatively, the exit of the support tube may be fashioned as a nozzle at the end to form a jet or dispersion of gas to aid in the distribution of the catalyst composition. In one embodiment, the internal diameter of the support tube is reduced gradually by about 3 to 80% at the end, preferably about 5 to 50% in a taper to create a nozzle to accelerate to and or disperse the fluid flow. The insertion of the injection tube is not impacted by the internal taper of the support tube.

In another embodiment of the invention the contact time of the slurry and the solution can be varied to adjust or control formation of the active catalyst complex. The contact time of the slurry and the solution is preferably in the range of from 1 minute to 120 minutes, preferably in the range of from 2 minutes to 60 minutes, preferably 5 minutes to 45 minutes, more preferably from about 10 minutes to about 30 minutes.

In another embodiment, the contact temperature of the slurry and the solution is in the range of from 0° C. to about 80° C., preferably from about 0° C. to about 60° C., more preferably from about 10° C., to about 50° C. and most preferably from about 20° C. to about 40° C.

In another embodiment, the invention provides introducing the immobilized catalyst system in the presence of a mineral oil or a surface modifier or a combination thereof as described in PCT publication WO 96/11960 and U.S. Ser. No. 09/113,261 filed Jul. 10, 1998, U.S. Pat. No. 6,031,120 which are herein fully incorporated by reference. In another embodiment a slurry or surface modifier, such as an aluminum stearate in mineral oil) is introduced (T) into the reactor with the combination of the slurry and the solution. In another embodiment the surface modifier, such as aluminum stearate, was added into the slurry vessel (A).

In another embodiment the one or all of the catalysts are combined with up to 6 weight % of a metal stearate, (preferably a aluminum stearate, more preferably aluminum distearate) or an anti-static agent based upon the weight of the catalyst, any support and the stearate or anti-static agent, preferably 2 to 3 weight %. In one embodiment, a solution or slurry of the metal stearate or anti-static agent is fed into the reactor. The stearate or anti-static agent may be combined with the slurry (A) or the solution (C) or may be co-fed (R) with the combination of the slurry and the solution. In a preferred embodiment the catalyst compounds and or activators are combined with about 0.5 to about 4 weight % of an antistat, such as a methoxylated amine, such as Witco's Kemamine AS-990 from ICI Specialties in Bloomington Del.

In another embodiment the catalyst system or the components thereof are combined with benzil, xylitol, Irganox™ 565, sorbitol or the like and then fed into the reactor. These agents may be combined with the catalyst compounds and/or activators or may be fed into the reactor in a solution with or without the catalyst system or its components. Similarly these agents may be combined with the slurry (A) or the solution (C) or may be co-fed (R) with the combination of the slurry and the solution.

In another embodiment the process of this invention may further comprise additional solutions and slurries. For example, in a preferred embodiment a slurry can be combined with two or more solutions having the same or different catalyst compounds and or activators. Likewise, the solution may be combined with two or more slurries each having the same or different supports, and the same or different catalyst compounds and or activators. Similarly the process of this invention may comprise two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, are each independently combined, in-line, with the slurry.

E. Use of Catalyst Composition to Control Product Properties

The timing, temperature, concentrations, and sequence of the mixing of the solution, the slurry and any optional added materials (nucleating agents, catalyst compounds, activators, etc) described above can be used to alter product properties. The melt index, relative amount of polymer produced by each catalyst, and other properties of the polymer produced may also be changed by manipulating process parameters which include manipulating hydrogen concentration in the polymerization system or by:

1) changing the amount of the first catalyst in the polymerization system, and/or
2) changing the amount of the second catalyst in the polymerization system, and/or
3) changing the hydrogen concentration in the polymerization process; and/or
4) changing the relative ratio of the catalyst in the polymerization process (and optionally adjusting their individual feed rates to maintain a steady or constant resin production rate); and/or
5) changing the amount of liquid and/or gas that is withdrawn and/or purged from the process; and/or
6) changing the amount and/or composition of a recovered liquid and/or recovered gas returned to the polymerization process, said recovered liquid or recovered gas being recovered from polymer discharged from the polymerization process; and/or
7) using a hydrogenation catalyst in the polymerization process; and/or
8) changing the polymerization temperature; and/or
9) changing the ethylene partial pressure in the polymerization process; and/or
10) changing the ethylene to comonomer ratio in the polymerization process; and/or
11) changing the activator to transition metal ratio in the activation sequence; and/or
12) changing the relative feed rates of the slurry and/or solution; and/or
13) changing the mixing time, the temperature and or degree of mixing of the slurry and the solution in-line; and/or
14) adding different types of activator compounds to the polymerization process; and/or
15) adding oxygen or fluorobenzene or other catalyst poison to the polymerization process.

For example to alter the flow index and or melt index of a polymer produced according to the invention using a slurry of supported methylalumoxane and $[(2,4,6-Me_3C_6H_2)NCH_2CH_2]_2NH\}ZrBz_2$ and a solution of bis(n-propyl cyclopentadienyl)zirconium dichloride one can alter the temperature of the reaction in the polymerization reactor, one can alter the concentration of hydrogen in the reactor, or one can alter the concentration of the bis(n-propyl cyclopentadienyl)zirconium dichloride in the solution prior to contacting the solution with the slurry, or one can alter the relative feed rate of the catalyst component solution and/or the catalyst component slurry.

In a preferred embodiment, the flow index ($I_{21}$-measured according to ASTM D-1238, Condition E, at 190° C.) of the polymer product is measured at regular intervals and one of the above factors, preferably temperature, catalyst compound feed rate, the ratio of the two or more catalysts to each other, monomer partial pressure, oxygen concentration, and or hydrogen concentration, is altered to bring the flow index to the desired level, if necessary. Preferably the samples for flow index measurements are melt-homogenized by extruding in an extruder that is equipped with either a single screw, preferably with a mixing head, or a twin screw, to make either tape or strand(s). The tape and or strands are typically cut into small pieces for flow property measurements.

In an embodiment, a polymer product property is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, preferably 100:1 to 1:100, more preferably 50:1 to 1:50 and most preferably 40:1 to 1:10. In another embodiment, the molar ratio of a Group 15 catalyst compound in the slurry to a bulky ligand metallocene catalyst compound in the solution, after the slurry and solution have been mixed to form the catalyst composition, is 500:1, preferably 100:1, more preferably 50:1, more preferably 10:1 and even more preferably 5:1. Preferably, the product property measured is the polymer product's flow index, melt index, density, MWD, comonomer content and combinations thereof. In another embodiment, when the ratio of the catalyst compounds is altered, the introduction rate of the catalyst composition to the reactor, or other process parameters, is altered to maintain a desired production rate.

Likewise, the support architecture, the number of functional groups on the support (such as-OH groups on silica) the activator loading and the pre-impregnated catalyst loading can also affect the product formed.

Similarly, altering the ethylene partial pressure can alter product properties. For example in a system where the solution comprised bis(n-propyl cyclopentadienyl) zirconium dichloride and the slurry comprised [(2,4,6-Me$_3$C$_6$H$_2$)NCH$_2$CH$_2$]$_2$NHZrBz$_2$ and supported methyl alumoxane, increasing the ethylene partial pressure in the gas phase reactor from 220 to 240 psi (1.5–1.7 MPa) increased the Flow Index from 100 to over 700 dg/min.

While not wishing to be bound by or limited to any theory, the inventors believe, that the processes described herein immobilize the solution catalyst compound in and on a support, preferably a supported activator. The in-line immobilization techniques described herein preferably result in a supported catalyst system that when introduced to the reactor provides for better particle morphology, bulk density, and/or higher catalyst activities and without the need for additional equipment in order to introduce catalyst compound solution into a reactor, particularly a gas phase or slurry phase reactor. It is known in the art that typical support techniques for supporting, metallocene catalyst compounds results in lower overall productivity of the formed supported catalysts. In some instances the supporting process in fact renders certain of these catalyst compounds useless in commercial polymerization processes that especially prefer the utilization of supported catalysts. This is particularly true when comparing introducing an unsupported catalyst system into a gas phase process versus a conventional supported catalyst system. By conventional supported catalysts system it is meant those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed Jul. 7, 1994 U.S. Pat. No. 5,468,702 and 788,736 filed Jan. 23, 1997 U.S. Pat. No. 6,090,740 and PCT publications WO 95/32995, WO 95/14044, WO 96/06187 and WO 97/02297, and EP-B1-0 685 494. It was also surprisingly discovered that catalyst systems not commercially supportable in a gas phase process in particular were found to be useful when immobilized using the process of the invention.

VI. Polymerization Process

The catalyst systems prepared and the method of catalyst system addition described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 3 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In an embodiment, the mole ratio of comonomer to ethylene, $C_x/C_2$, where $C_x$ is the amount of comonomer and $C_2$ is the amount of ethylene is between about 0.001 to 0.200 and more preferably between about 0.002 to 0.008.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable of and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 5,986,021, which are herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr). Examples of solution processes are described in U.S. Pat. Nos. 4,271,060, 5,001,205, 5,236,998, 5,589,555 and 5,977,251 and PCT WO 99/32525 and PCT WO 99/40130, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the metallocene catalyst systems of the invention described above prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In one embodiment, toluene is not used in the preparation or polymerization process of this invention.

VII. Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

The polymers, typically ethylene based polymers, have a density in the range of from 0.86 g/cc to 0.97 g/cc, depending on the desired use. For some applications a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM-D-1238.

The polymers produced by the process of the invention may have a molecular weight distribution, a ratio of weight average molecular weight to number average molecular weight ($M_w/M_n$), of greater than 1.5 to about 70. In some embodiments the polymer produced has a narrow $M_w/M_n$ of about 1.5 to 15, while in other embodiments the polymer produced has an $M_w/M_n$ of about 30 to 50. Also, the polymers of the invention may have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. In some embodiments the polymer produced may have a CDBI of 80% or more or may have a CDBI of 50% or less.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using this invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.01 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In one embodiment the polymers produced by this invention have a multimodal molecular weight distribution (Mw/Mn) or, a typically, bimodal molecular weight distribution. In a preferred embodiment, the polymer produced has a density of 0.93 to 0.96 g/cc, an MI ($I_2$) of 0.03–0.10 g/10 min, an FI ($I_{21}$) of 4–12 g/10 min, an MFR ($I_{21}/I_2$) of 80–180, an overall Mw of 200,000 to 400,000, an overall Mn of 5,000–10,000 and an Mw/Mn of 20–50. Preferably the low molecular weight fraction (~500—~50,000) has a density of 0.935–0.975 g/cc and the high molecular weight fraction (~50,000–~8,000,000) has a density of 0.910–0.950 g/cc. These polymers are particularly useful for film and pipe, especially, for PE-100 pipe applications. More preferably, this embodiment of the polymer has the following molecular weight distribution (MWD) characteristics. The MWDs, as obtained from size exclusion chromatography (SEC), can be deconvoluted using the bimodal fitting program. The preferred split of the polymer, the ratio of Wt % of HMW fraction and the Wt % of LMW fraction, is 20–80 to 80–20, more preferably 30–70 to 70–30, and even more preferably 40–60 to 60–40. Higher Wt % of HMW than LMW Wt % is preferred. The SEC curve can be further analyzed to give percent of Wt %>1 MM, which is the weight percent of the total MWD that has a molecular weight greater than 1 million, and Wt %>100K, which is the weight perecent of the total MWD that is greater than 100,000 in molecular weight. The weight percent ratio is simply Wt %>1 MM divided by Wt %>100K. 100,000 was used as an approximate means of dividing the total MWD into a HMW (high molecular weight) and LMW (low molecular weight) region. This ratio gives a simple but sensitive indication of the relative amount of the very high molecular weight species in the HMW region of the MWD. The prefered embodiment of the polymer has the preferred range of weight percent ration (WPR), higher than 10 but less than 30, preferably higher than 15 but less than 25. The stability of blown bubble during film extrusion is found to depend on this WPR as shown in the table below. A preferred catalyst system to produce these polymers according to this invention comprises $[(2,4,6\text{-Me}_3C_6H_2)NCH_2CH_2]_2NH\}HfBz_2$ or $[(2,4,6\text{-Me}_3C_6H_2)NCH_2CH_2]_2NH\}ZrBz_2$ combined with bis(indenyl)zirconium dichloride, (pentamethylcyclopentadienyl)(n-propylcyclopentadienyl)zirconium dichloride or (tetramethylcyclopentadienyl)(n-propylcyclopentadienyl)zirconium dichloride, and supported methylalumoxane.

| Sample | FI | MI | MFR | HMW Mw | HMW % Split | Wt %> 1 MM | Wt %> 100 K | wt % Ratio | Bubble Stability |
|---|---|---|---|---|---|---|---|---|---|
| No.1 | 8.32 | 0.051 | 167.3 | 605,500 | 53.5% | 9.7% | 41.8% | 23% | Poor |
| No.2 | 7.45 | 0.06 | 124 | 584,000 | 50.1% | 8.7% | 41.7% | 21% | Good |
| No.3 | 7.99 | 0.047 | 168.7 | 549,900 | 53.3% | 8.7% | 40.9% | 21% | Good |
| No.4 | 9.16 | 0.076 | 121.2 | 454,700 | 58.3% | 7.5% | 42.1% | 18% | Good |
| No.5 | 8.11 | 0.094 | 86.7 | 471,800 | 53.7% | 6.6% | 43.3% | 15% | Poor |

Figure 5:
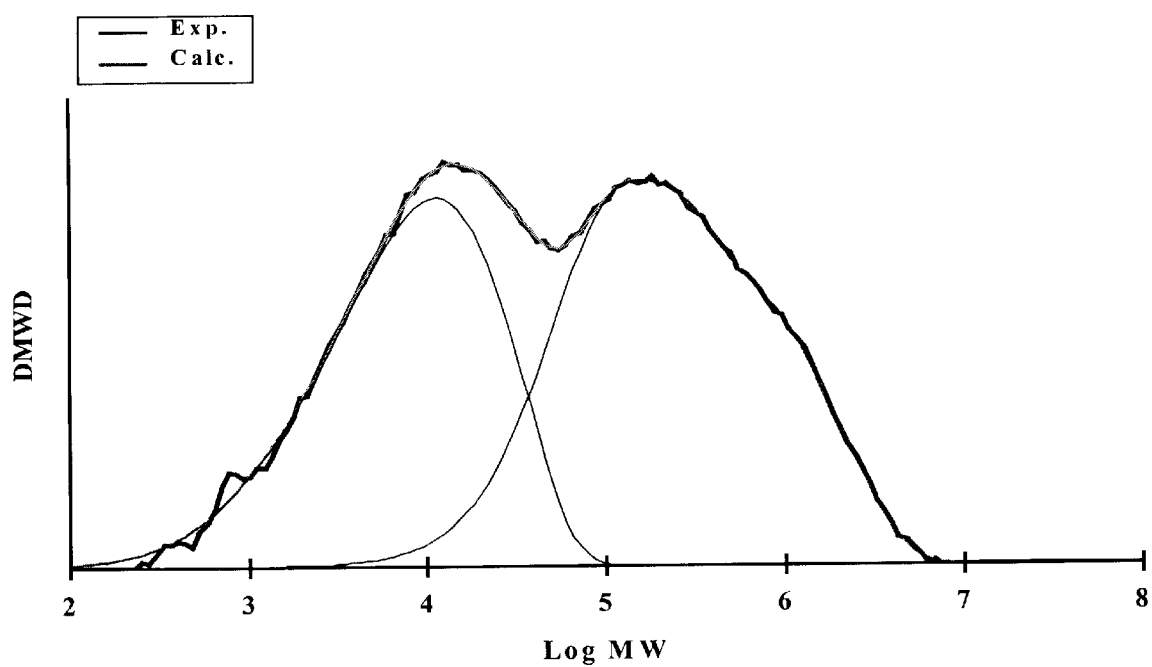
FIG. 5 is a typical SEC curve of one embodiment of the polymer.

A typical SEC curve of the embodiment of the polymer is shown in the FIG. 5. Two distinctive peaks of HMW and LMW fractions can be seen with the deconvoluted curves.

|  | LMW | HMW | Overall |
|---|---|---|---|
| Mn | 3,231 | 91,514 | 8,076 |
| Mw | 12,307 | 505,322 | 291,217 |
| Mw/Mn | 3.81 | 5.52 | 36.06 |
| Wt % | 43.57% | 56.43% | |

This multimodal or bimodal polymer is found to exhibit excellent bubble stability and good film extrusion characteristics. The polymer demonstrated excellent draw-down characteristics and as thin as 0.35 mil film was obtained. The film appearance rate was excellent with no speck of gels. The film dart impact strength was excellent suitable which is suitable for grocery sacks applications.

In another embodiment the polymer produced by this invention has a bimodal molecular weight distribution (Mw/Mn). In a preferred embodiment, the polymer produced has a density of 0.93 to 0.97 g/cc, an MI ($I_2$) of 0.02–0.5 g/10 min, an FI ($I_{21}$) of 10–40 g/10 min, an MFR ($I_{21}/I_2$) of 50–300, an Mw of 100,000 to 500,000, an Mn of 8,000–20,000 and an Mw/Mn of 10–40. These polymers are particularly useful for blow molding applications. These bimodal polymers exhibited extraordinary Bent Strip ESCR (environmental stress crack resistance) performance, which far exceeds the performance of unimodal HDPE. Also, the blow molded bottles trimmed easier and had opaque finish, which is preferred over translucent finish of unimodal HDPE.

In yet another embodiment, propylene based polymers are produced in the process of the invention. These polymers include atactic polypropylene, isotactic polypropylene, hemi-isotactic and syndiotactic polypropylene or mixtures thereof produced by using two or more different catalysts in the practice of this invention. Other propylene polymers include propylene block or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

In another embodiment, the polymer of the invention is made into a pipe by methods known in the art. For pipe applications, the polymers of the invention have a $I_{21}$ of from about 2 to about 10 dg/min and preferably from about 2 to about 8 dg/min. In another embodiment, the pipe of the invention satisfies ISO qualifications. In another embodiment, the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference The polyolefins of the invention can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film application, the polymers of the invention have a $I_{21}$ of from about 2 to about 50 dg/min, preferably from about 2 to about 30 dg/min, even more preferably from about 2 to about 20 dg/min, still more preferably about 5 to about 15 dg/min and yet more preferably from about 5 to about 10 dg/min.

The objects produced (such as films, pipes, etc) may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

In another embodiment, the polymer of the invention is made into a molded article by methods known in the art, for example, by blow molding and injection-stretch molding. For molded applications, the polymers of the invention have a $I_{21}$ of from about 20 dg/min to about 50 dg/min and preferably from about 35 dg/min to about 45 dg/min.

Further, while not wishing to be bound by any theory, it is believed that the polymers produced by this invention have the unique advantage of the two polymer products being so intimately blended that there is an even distribution of the two polymers across the polymer particles as they exit the reactor. The unprocessed, untreated granular polymer is referred to as neat polymer. The neat polymer is then separated into fractions by standard sieve sizes according to ASTM D 1921 particle size (sieve analysis) of Plastic Materials, Method A or PEG Method 507.

| Sieve size | Fraction Collected | Fraction Name |
|---|---|---|
| 10 mesh | >2000 μm | Fraction 1 |
| 18 mesh | 2000–1000 μm | Fraction 2 |
| 35 mesh | <1000–500 μm | Fraction 3 |
| 60 mesh | <500–250 μm | Fraction 4 |
| 120 mesh | <250–125 μm | Fraction 5 |
| 200 mesh/Pan | <125 μm | Fraction 6 |
| Overall | | Fraction 6 |

The individual fractions (Fraction 2, 3, 4, 5) are then tested for physical properties. Melt index is measured according to ASTM 1238, condition E, 190° C.

A unique attribute of the polymer produced herein is that the melt indices of the different fractions do not vary significantly. In a preferred embodiment the melt indices of Fractions 3, 4 and 5 do not vary by more than 40% relative, preferably by not more than 30% relative, preferably by not more than 10% relative, preferably by not more than 8% relative, preferably by not more that 6% relative, preferably by not more than 4% relative. Relative means relative to the mean of the values for Fractions 3, 4 and 5.

In another embodiment, fractions 2, 3, 4 and 5 comprise more than 90% of the total weight of the resin sample, preferably fractions 2, 3 and 4 comprise more than 90% of the total weight of the resin sample.

Another desirable attribute of the polymer produced herein is that the Mw/Mn of the different fractions do not vary significantly. In a preferred embodiment the Mw/Mn of Fractions 1, 4, 5 and 6 do not vary by more than 20% relative, preferably by not more than 10% relative, preferably by not more than 8% relative, preferably by not more than 6% relative, preferably by not more that 4% relative, preferably by not more than 2% relative. In a preferred embodiment the Mw/Mn of Fractions 1, 4 and 6 do not vary by more than 20% relative, preferably by not more than 10% relative, preferably by not more than 8% relative, preferably by not more than 6% relative, preferably by not more that 4% relative, preferably by not more than 2% relative. Relative means relative to the mean of the values for Fractions 1, 4 and 6. In a another preferred embodiment the Mw/Mn of Fractions 2, 3, 4 and 5 do not vary by more than 20% relative, preferably by not more than 10% relative, preferably by not more than 8% relative, preferably by not more than 6% relative, preferably by not more that 4% relative, preferably by not more than 2% relative. Relative means relative to the mean of the values for Fractions 2, 3, 4 and 5. In a another preferred embodiment the Mw/Mn of Fractions 3, 4 and 5 do not vary by more than 20% relative, preferably by not more than 10% relative, preferably by not more than 8% relative, preferably by not more than 6% relative, preferably by not more that 4% relative, preferably by not more than 2% relative. Relative means relative to the mean of the values for Fractions 3, 4 and 5. Mn and Mw are measured by gel permeation chromatography on a waters 150° C. GPC instrument equipped with differential refraction index detectors. The GPC columns are calibrated by running a series of narrow polystyrene standards and the molecular weights are calculated using broad polyethylene standards National Bureau of Standards 1496 for the polymer in question.

In another preferred embodiment the polymer produced according to this invention comprises 10–90 weight % of low molecular weight polymer (low is 50,000 or less preferably 40,000 or less), preferably 20 to 80 weight %, more preferably 40–60 weight %, based upon the weight of the polymer.

In one embodiment the fractions have the following characteristics.

| Sieve size | Fraction Collected | Weight % | I21 | I5 | I2 | Fraction Name |
|---|---|---|---|---|---|---|
| 10 mesh | >2000 μm | 0.5 | | | | Fraction 1 |
| 18 mesh | 2000–1000 μm | 1.02 | 23.9 | 0.75 | 0.14 | Fraction 2 |
| 35 mesh | <1000–500 μm | 15.11 | 37.6 | 1.18 | 0.22 | Fraction 3 |
| 60 mesh | <500–250 μm | 44.05 | 41.0 | 1.28 | 0.20 | Fraction 4 |
| 120 mesh | <250–125 μm | 33.62 | 40.8 | .93 | 0.18 | Fraction 5 |
| 200 mesh/Pan | <125 μm | 5.70 | | | | Fraction 6 |
| Overall | | 100.0 | 41.6 | 1.18 | 0.23 | Fraction 6 |

In another embodiment the polyolefin produced is found to have at least two species of molecular weights present at greater than 20 weight % based upon the weight of the polymer.

In another embodiment of this invention the polymer produced is bi- or multi-modal (on the SEC graph). By bi- or multi-modal is meant that the SEC graph of the polymer has two or more positive slopes, two or more negative slopes, and three or more inflection points (an inflection point is that point where the second derivative of the curve becomes negative) OR the graph has at least has one positive slope, one negative slope, one inflection point and a change in the positive and or negative slope greater than 20% of the slope before the change. In another embodiment the SEC graph has one positive slope, one negative slope, one inflection point and an Mw/Mn of 10 or more, preferably 15 or more, more preferably 20 or more. The SEC graph is generated by gel permeation chromatography on a waters 150° C. GPC instrument equipped with differential refraction index detectors. The columns are calibrated by running a series of narrow polystyrene standards and the molecular weights were calculated using Mark Houwink coefficients for the polymer in question.

The films produced using the polymers of this invention have extremely good appearance properties. The films have a low gel content and/or have good haze and gloss. In a preferred embodiment the 1 mil film (1.0 mil=0.25 μm) has a 45° gloss of 7 or more, preferably 8 or more as measured by ASTM D 2475. In a preferred embodiment the 1 mil film (1.0 mil=25 μm) has a haze of 75 of less, preferably 70 or less as measured by ASTM D 1003, condition A.

In order to provide a better understanding of the present invention including representative advantages thereof, the following examples are offered.

EXAMPLES

Mn and Mw were measured by gel permeation chromatography on a waters 150° C. GPC instrument equipped with differential refraction index detectors. The GPC columns were calibrated by running a series of molecular weight standards and the molecular weights were calculated using Mark Houwink coefficients for the polymer in question.

Density was measured according to ASTM D 1505.

Melt Index (MI) and Flow Index (FI) $I_2$ and $I_{21}$ were measured according to ASTM D-1238, Condition E, at 190° C.

Melt Index Ratio (MIR) is the ratio of $I_{21}$ over $I_2$ as determined by ASTM D-1238.

Weight % comonomer was measured by proton NMR.

$MWD=M_w/M_n$

Dart Impact was measured according to ASTM D 1709.

MD and TD Elmendorf Tear were measured according to ASTM D 1922.

MD and TD 1% Secant modulus were measured according to ASTM D 882.

MD and TD tensile strength and ultimate tensile strength were measured according to ASTM D 882.

MD and TD elongation and ultimate elongation were measured according to ASTM D 412.

MD and TD Modulus were measured according to ASTM 882-91

Haze was measured according to ASTM 1003-95, Condition A.

45° gloss was measured according to ASTM D 2457.

BUR is blow up ratio.

"PPH" is pounds per hour. "mPPH" is millipounds per hour. "ppmw" is parts per million by weight.

Example 1

Preparation of SMAO Supported Activator

For a 1 Kg batch, 1158.43 grams of 30 wt % MAO in toluene (7.3 wt % Al) available from Albemarle Corporation, Baton Rouge, La., and 2400 grams of extra toluene are charged into an 8 liter mix tank equipped with ribbon helical agitator. 984 grams of Davison 955-600 silica is added to MAO in toluene solution at ambient temperature. A 10° C. exotherm occurs from reaction of the MAO with the hydroxyl groups. The slurry mixes for 30 minutes at ambient temperature. Drying then occurs by heating the mix tank jacket to about 70° C. and reducing pressure to 0.00 mm/hg. As the slurry thickens the agitator rpm is reduced to minimum rotation, about 40–60 RPM. Then the rotation is slowly increased (to about 600 RPM) and the temperature is raised to 95° C. as the slurry turns to a dry powder. A nitrogen sweep (about 0.5 cc/min per gram of silica charged) can be used during the end of the drying step to help remove toluene from the silica pores. The material is typically held at 95° C. until toluene removal stops, and material temperature lines out near jacket temperature. The material temperature does not change for at least 30 minutes before the supported methylalumoxane (SMAO) is considered dry. Residual toluene is reduced to less than 2 wt % on the solids.

Example 2

Figure 2:
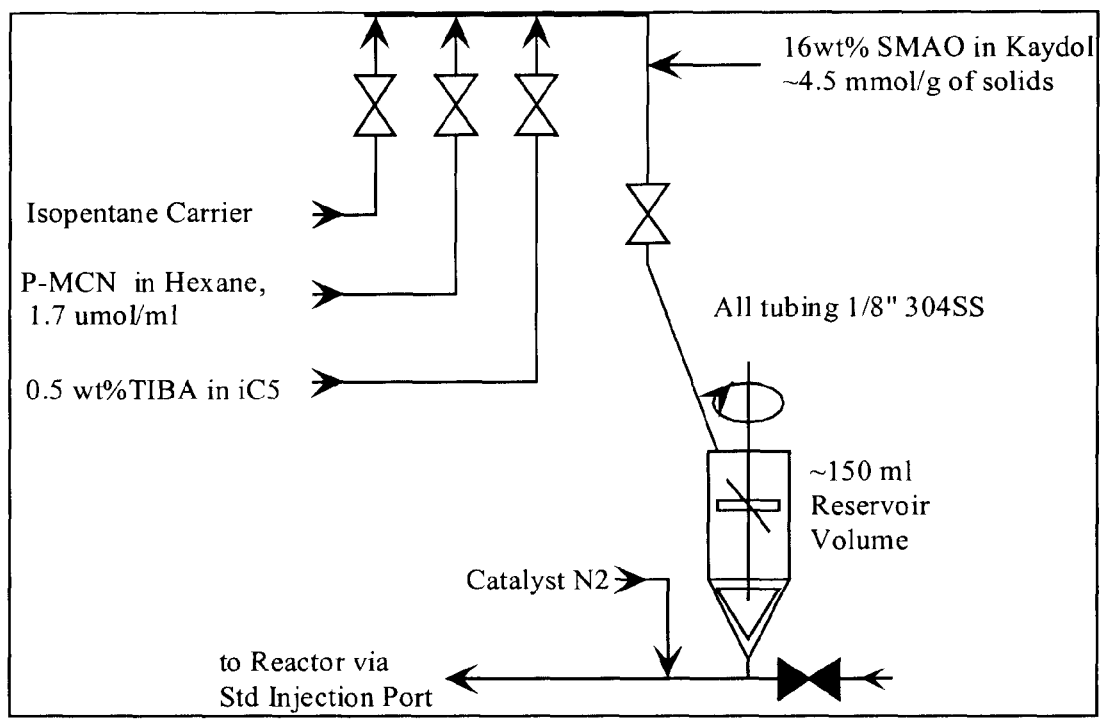
FIG. 2 illustrates the catalyst feed configuration used for Example 2.

Solution Catalyst Compound Activated with Slurry Comprising Supported Activator in Fluidized Gas-Phase Reactor with Shorter Contact Time Polymerization performance of in-line supported bis(n-propyl cyclopentadienyl)zirconium dichloride (P-MCN) was evaluated in a 8 inch (20.3 cm) fluidized bed pilot plant reactor. The catalyst feed configuration is shown schematically in FIG. 2. P-MCN (1.7 umol/ml in hexane) was introduced in line at 0.65 g/hr. 0.5 weight % of TiBA in isopentane (200–250 cc/hr of isopentane carrier and 75–90 cc/hr of 0.5 wt % TiBA) was introduced in line. Thereafter a slurry comprising Kaydol mineral oil and 16 weight % of SMAO produced in Example 1 (4.5 mmol/g solids) was introduced in line and allowed to mix with the solution of P-MCN and TiBA for 25–35 minutes. Following the mixer, the catalyst was injected using a standard ⅛ inch (0.32 cm) injection tube with 1.05 pph of $N_2$ blowback.

The catalyst was evaluated at LLDPE conditions, 75 C., 350 psig (2.4 MPa) total pressure, 120 psi (0.8 MPa) ethylene, 0.017 hexene-1 comonomer to ethylene ratio. No hydrogen was fed to the reactor since this catalyst makes sufficient hydrogen to produce 2–5 dg/min melt index polymer under the conditions employed. The superficial gas velocity (SGV) was maintained at 1.54 ft/s (0.47m/s) and the steady state bed weight at 27 lbs (12.3 kg). The reactor was operated continuously, i.e. for approximately 13 hours per day, generally holding bed weight constant to yield a bed level near the top of the straight section. Where possible, the reactor was left closed overnight with the bed being fluidized in a nitrogen atmosphere. TiBA (triisobutyl aluminum) in isopentane was fed as a scavenger at approximately 75 ppm in the bed to give catalyst productivity that is commercially relevant.

The product had a 6.1 dg/min (I2), 17.6 MFR and 0.93 g/cc density. The resin average particle size was 0.022 inches (0.056 cm) with 2.4 wt % fines (<120 mesh). The settled bulk density was 27.4 lb/cu-ft. A residual zirconium of 0.66 ppm, aluminum of 33 ppm and silica of 75 ppm was measured by ICP (Inductively Coupled Plasma spectroscopy).

Example 3

Figure 3:
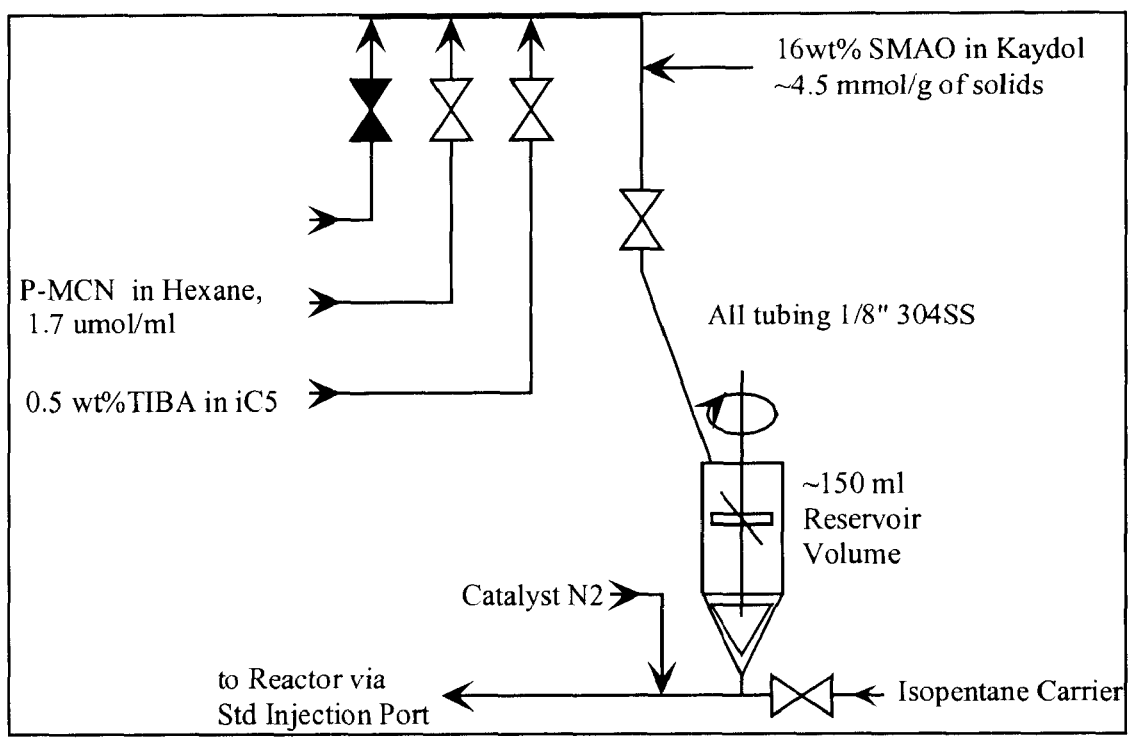
FIG. 3 illustrates the catalyst feed configuration used for Example 3.

Solution Catalyst Compound Activated with Slurry Comprising Supported Activator in Fluidized Gas-phase Reactor with Longer Contact Time Polymerization performance of in-line supported bis(n-propyl cyclopentadienyl)zirconium dichloride (P-MCN) was evaluated in a 8 inch (20.3 cm) fluidized bed pilot plant reactor. The catalyst feed configuration is shown schematically in FIG. 3. P-MCN, fed at 0.56 g/hr with 65–100 cc/hr of 0.5 wt % TIBA in isopentane upstream, was contacted with 16 wt % SMAO (as produced in Example 1) in Kaydol mineral oil upstream of the 150 ml mixer. The solution and the slurry were allowed to mix for 90 to 130 minutes. 200–250 cc/hr of isopentane carrier was used to sweep the catalyst exiting the mixer to the reactor. Following the mixer, catalyst was injected using a standard 1/8 inch (0.32 cm) injection tube with 1.1 pph $N_2$ blowback.

Catalyst was evaluated at LLDPE conditions, 75° C., 350 psig (2.4 MPa) total pressure, 120 psi (0.8 MPa) ethylene, 0.017 hexene-1 comonomer to ethylene ratio. No hydrogen was fed to the reactor since this catalyst makes sufficient hydrogen to produce 2–5 dg/min melt index polymer under the conditions employed. The superficial gas velocity (SGV) was maintained at 1.38 ft/s (0.42 m/s) and the steady state bed weight at 30.5 lbs (13.6 kg). The reactor was operated continuously for ~13 hours per day, generally holding bed weight constant to yield a bed level near the top of the straight section. Where possible, the reactor was left closed overnight with the bed being fluidized in a nitrogen atmosphere. TIBA(triisobutyl aluminum) in isopentane was fed as a scavenger at ~75 ppm in the bed to give catalyst productivity that is commercially relevant.

The product had a 5.3 dg/min ($I_2$), 18.9 MFR and 0.928 g/cc density. The resin average particle size was 0.021 inches (0.053 cm) with 2.8 wt % fines (<120 mesh). The settled bulk density was 26.0 lb/cu-ft. A residual zirconium of 0.55 ppm, aluminum of 35 ppm and silica of 78 ppm was measured by ICP.

The data for Examples 2 and 3 are summarized in Table 1.

Example 4

Figure 4:
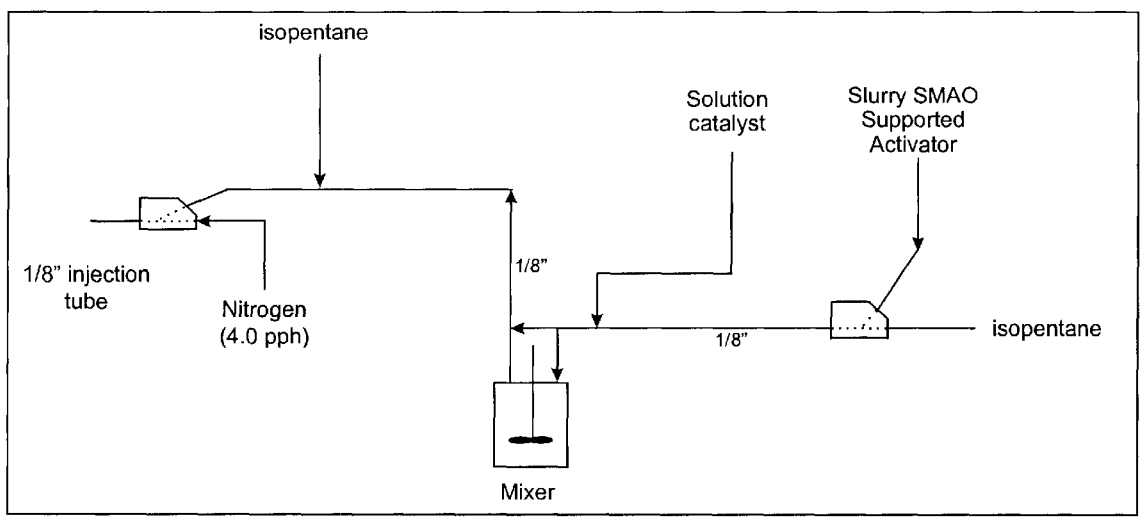
FIG. 4 illustrates the catalyst feed configuration used for Example 4.

Solution Catalyst Compound Activated with Slurry Comprising Supported Activator in Fluidized Gas-phase Reactor Polymerization performance of in-line supported bis(n-propyl cyclopentadienyl)zirconium dichloride (P-MCN) was evaluated in a 14 inch (35.6 cm) fluidized bed pilot plant reactor. The catalyst feed configuration used for in-line activation of P-MCN with SMAO is shown in FIG. 4. Catalyst solution, fed at 10 cc/hr, was contacted with 1.0 pph isopentane carrier and 10 cc/hr of 15 wt % SMAO (as produced in Example 1) in Kaydol mineral oil upstream of the 100 ml agitated mixer. Following the mixer, catalyst was injected using a standard 1/8 inch (0.3 cm) injection tube with 2.0 pph $N_2$ blowback.

The catalyst system was evaluated at LLDPE conditions, 85° C., 350 psig (2.4 MPa) total pressure, 200 psi (1.4 MPa) ethylene, 0.0185 hexene-1 comonomer to ethylene mole ratio ($C_6/C_2$). A concentration of 200 ppm hydrogen was maintained in the reactor. The superficial gas velocity (SGV) was maintained at 2.0 ft/s (0.6 m/s) and the steady state bed weight at 110 lbs (50 kg). The reactor production rate was at 31 pph.

The catalyst feed configuration used for in-line activation of P-MCN with SMAO activator is shown in FIG. 4. Following the mixer, catalyst was injected using a standard 1/8 inch (0.3 cm) injection tube with 2.0 pph $N_2$ blowback. Catalyst, fed at 10 cc/hr, was contacted with 1.0 pph isopentane carrier and 10 cc/hr of 15 wt % SMAO (as produced in example 1) in Kaydol mineral oil upstream of the 100 ml agitated mixer.

The product had a 5.89 dg/min (I2), 16.6 MFR and 0.926 g/cc density. The resin average particle size was 0.033 inches (0.084 cm) with 0.56 wt % fines (<120 mesh). The

TABLE 1

8 INCH (20.3 CM) FLUIDIZED BED DATA SUMMARY

| Reaction Conditions | Example 2 | Example 3 |
| --- | --- | --- |
| Production Rate (lb/hr) (kg/hr) @ Steady State | 7.7 (3.5) | 7.1 (3.2) |
| Fluidized Bulk Density (lb/ft$^3$) (kg/m$^3$) | 12–13.9 (192–223) | 16–18.5 (256–296) |
| Seed Bed Quanity (lb) (kg) | 11 (5) | 22 (10) |
| Bed Turnovers at Shutdown | 2.2 | 1.6 |
| Theoretical wt % seed bed at shutdown | 0.11 | 0.19 |
| Catalyst Feed Parameter | | |
| Cat Feed Rate (g/hr) at SS, dry basis | 0.65 | 0.56 |
| Catalyst Carriers Upstream of Mixer | | |
| Isopentane (cc/hr) | 200–250 | na |
| 0.5 wt % TIBA in iC$_5$ (cc/hr) | 45–90 | 65–100 |
| Catalyst Carriers Downstream of Mixer | | |
| Isopentane (cc/hr) | n/a | 200–250 |
| N$_2$ (lb/hr) (kg/hr) | 1.05 (0.5) | 1.1 (0.5) |
| Resin Properties: | | |
| Melt Index I$_2$ dg/min | 6.1 | 5.3 |
| MFR (I$_{21}$/I$_2$) | 17.6 | 18.9 |
| Density (g/ml) | 0.93 | 0.928 |
| Bulk Density (lb/ft3) (kg/m$^3$) | 27.4 (439) | 26 (416) |
| Average Particle Size (in) (cm) | 0.022 (0.06) | 0.021 (0.05) |
| Fines <120 mesh (wt %) | 2.4 | 2.8 |
| Quantity (lb) Net (kg) | 69 (31.3) | 51 (23.1) |
| Zr Residue (ppmw by ICP) | 0.66 | 0.55 |
| Al Residue (ppmw by ICP) | 33 | 35 |
| Si Residue (ppmw by ICP) | 75 | 78 | settled bulk density was 17.1 lb/cu-ft. A residual zirconium of 0.28 ppm and aluminum of 35 ppm was measured by X-ray fluorescence.

Example 5
Solution Bis-indenyl Catalyst Compound Activated with Slurry Comprising Supported Activator in Fluidized Gas-phase Reactor Polymerization performance of supported bis-indenyl zirconium dichloride solution catalyst (bis-indenyl) was evaluated in a 14 inch (35.6 cm) fluidized bed pilot plant reactor. The catalyst feed configuration used for in-line activation of solution bis-indenyl metallocene catalyst compound with SMAO (from Example 1) is shown in FIG. 4. Catalyst, fed at 15 cc/hr, was contacted with 0.5 pph isopentane carrier and 15 cc/hr of 15 wt % SMAO in Kaydol mineral oil upstream of the 100 ml agitated mixer. Following the mixer, catalyst was injected using a standard ⅛ inch (0.32 cm) injection tube with 1.5 pph isopentane carrier and 4.0 pph $N_2$ blowback.

The catalyst system was evaluated at LLDPE conditions, 85° C., 350 psig (2.4 MPa) total pressure, 200 psi (1.4 MPa) ethylene, 0.016 hexene-1 comonomer to ethylene ratio ($C_6/C_2$). A concentration of 195 ppm hydrogen was maintained in the reactor. The superficial gas velocity (SGV) was maintained at 2.0 ft/s (0.6 m/s) and the bed weight at 110 lbs (50 kg). The reactor production rate was 38 pph.

The product had a 8.4 dg/min ($I_2$), 16.5 MFR and 0.9273 g/cc density. The resin average particle size was 0.0357 inches (0.091 cm) with 0.44 wt % fines (<120 mesh). The settled bulk density was 18.4 lb/cu-ft. A residual zirconium of <0.10 ppm and aluminum of 27 ppm was measured by X-ray fluorescence.

Example 6
Solution P-MCN Catalyst Compound Activated with Slurry Comprising SMAO and Second Catalyst Compound in Fluidized Gas-phase Reactor Polymerization performance of a solution comprising bis(n-propyl cyclopentadienyl)zirconium dichloride catalyst compound and a slurry comprising SMAO and [(2,4,6-Me$_3$C$_6$H$_2$)NCH$_2$CH$_2$]$_2$NHZrBz$_2$ was evaluated in a 14 inch (35.6 cm) fluidized bed pilot plant reactor. The catalyst feed configuration used for in-line activation of the solution used the bis(n-propylcyclopentadienyl)zirconium dichloride at 0.5 weight %, and a slurry comprising 17.3 weight % SMAO (from Example 1) in Kaydol. (The SMAO contained 4.5 mmol Al per gram of solid). The [(2,4,6-Me$_3$C$_6$H$_2$)NCH$_2$CH$_2$]$_2$NHZrBz$_2$ was added to the slurry off-line to make a 150:1 molar ratio of Al:Zr. The remaining portion of the slurry was Kaydol mineral oil. Catalyst, fed at 4 cc/hr, was contacted with 75 cc/hr of the SMAO/[(2,4,6-Me$_3$C$_6$H$_2$)NCH$_2$CH$_2$]$_2$NHZrBz$_2$ mixture in Kaydol mineral oil upstream of the series of two ten inch (25.4 cm) long ¼ inch (0.64 cm) diameter Kinecs static mixers (by Chemineer). The contact time between the solution and the slurry was approximately 5 minutes. Following the mixer, catalyst was injected using a standard ⅛ inch (0.32 cm) injection tube with 3 pph isopentane carrier and 5 pph $N_2$ carrier.

The catalyst system was evaluated at the following conditions, 105° C., 350 psig (2.4 MPa) total pressure, 220 psi (1.5 MPa) ethylene, and 0.0035 hexene-1 to ethylene molar ratio. A concentration of 1800 ppm hydrogen was maintained in the reactor. The superficial gas velocity (SGV) was maintained at 2.0 ft/s (0.6 m/s) and the bed weight at 75 lbs (34 kg). The reactor production rate was 21 pph The product had a 0.051 dg/min ($I_2$), 7.74 dg/min flow index, 151 MFR and 0.9502 g/cc density. The resin average particle size was 0.016 inches (0.04 cm) with 1.25 wt % fines (<120 mesh). The settled bulk density was 23.9 lb/cu-ft. A residual zirconium of <3.25 ppm and aluminum of 109 ppm was measured by X-ray fluorescence.

The data of examples 4, 5 and 6 are summarized in Table 2.

TABLE 2

14 INCH (35.6 CM) FLUIDIZED BED DATA SUMMARY

|  | Example 4 | Example 5 | Example 6 |
|---|---|---|---|
| Fluidized Bulk Density (lb/ft$^3$) (kg/m$^3$) | 11.0 (176) | 13.0 (208) | 15.4 (247) |
| Bed Turnovers at shutdown | 10.3 | 8.7 | 12 |
| Resin Properties |  |  |  |
| Melt Index ($I_2$ (dg/min) | 5.89 | 8.4 | 0.051 |
| Flow Index ($I_{21}$) (dg/min) | 97.65 | 138.7 | 7.74 |
| MFR ($I_{21}/I_2$) | 16.6 | 16.5 | 151 |
| Density (g/cc) | 0.926 | 0.9273 | 0.9502 |
| Bulk Density (lb/ft$^3$) (kg/m$^3$) | 17.1 (274) | 18.4 (295) | 23.9 (383) |
| Average Particle Size (in) (cm) | 0.033 (0.08) | 0.0357 (0.090) | 0.016 (0.04) |
| Fines <120 mesh (wt %) | 0.56 | 0.44 | 1.25 |
| Zr residue (ppm by X-ray) | 0.28 | <0.10 | 3.25 |
| Al residue (ppm by X-ray) | 34.7 | 27 | 109 |

Example 7

Several product samples made from polymerization with a slurry comprising SMAO and [(2,4,6-Me$_3$C$_6$H$_2$)NCH$_2$CH$_2$]$_2$NHZrBz$_2$, and solution bis(n-propyl cyclopentadienyl)zirconium dichloride (P-MCN) catalyst were evaluated for film applications. This bimodal HMW HDPE granular polymer was compounded on a 2.5 inch, 24:1 L/D single screw, equipped with double mixing head, at 210° C., after tumble mixed with a stabilizer package comprising 1,000 ppm of Irganox 1076, 1,500 ppm of Irgafos 168, and 1,500 ppm of Calcium Stearate. Two pelleted samples showed 8.4 and 9.9 FI, respectively, and 155 and 140 MFR. The density was 0.9524 and 0.9490, respectively. The pelleted polymer was film extruded on an Alpine film line equipped with a 50mm, 18:1 L/D single screw, a 100 mm die with 1 mm die gap. The die temperature was set at 210° C. The output was maintained at about 100 lb/hr, the blow-up ratio of the bubble was set at 4.0, and the frost line height was 36 inches. As shown in the table below, the bimodal polymer exhibited excellent bubble stability and film extrusion characteristics. The film dart impact strength was over 200 g and over 300 g, respectively for 1.0 mil and 0.5 mil gauge. The film samples also exhibited excellent tensile strength and modulus.

| Sample No. | Escorene HD 7755 | | A | | B | |
|---|---|---|---|---|---|---|
| Rxn Temp (° C.) | | | 105 | | 105 | |
| Rx pressure | | | 350 | | 350 | |
| C2 PP | | | 220 | | 220 | |
| H2/C2 (molar) | | | 0.003 | | 0.003 | |
| H2 ppm | | | 1800 | | 1800 | |
| Comonomer | | | C6 | | C6 | |
| Comonomer/C2 (molar) | | | 0.004 | | 0.0044 | |
| MI(I2) | 0.068 | | 0.055 | | 0.071 | |
| MI(I5) | | | | | 0.341 | |
| FI(I21) | 10 | | 8.37 | | 9.93 | |
| MFR(I21/I2) | 146.6 | | 155 | | 140 | |
| Density (g/cc) | 0.9518 | | 0.9524 | | 0.9490 | |
| Ouput Rate (lb/hr) | 100 | | 101 | | 104 | |
| Head pressure (psi) | 7,230 | | 7,350 | | 7,600 | |
| Motor Load (amp) | 58 | | 58.5 | | 59.8 | |
| BUR | 4 | | 4 | | 4 | |
| FLH (inch) | 36 | | 36 | | 36 | |
| Melt fracture | no | no | no | no | no | no |
| FAR | 40 | 40 | 40 | 40 | 40 | 40 |
| Bubble Stability | Good | fair | Good | Good | Good | Good |
| Take-up speed (fpm) | 92 | 182 | 92 | 184 | 92 | 184 |
| Film gauge (mil) | 1 | 0.5 | 1 | 0.5 | 1 | 0.5 |
| Dart Impact strength (g) | 250 | 330 | 200 | 340 | 230 | 340 |
| Tensile strength (psi) | | | | | | |
| MD | 10,000 | 11,000 | 8,500 | 11,820 | 8,600 | 12,800 |
| TD | 7,500 | 7,500 | 6,300 | 8,440 | 10,000 | 8,900 |
| Elongation (%) | | | | | | |
| MD | 490 | 380 | 400 | 325 | 530 | 300 |
| TD | 570 | 390 | 630 | 370 | 430 | 380 |
| Elmendorf Tear (g/mil) | | | | | | |
| MD | 22 | 12 | 22 | 11 | 21 | 12 |
| TD | 186 | 36 | 360 | 42 | 180 | 26 |
| Modulus (psi) | | | | | | |
| MD | 130,400 | 129,400 | 116,000 | 167,200 | 111,000 | 114,000 |
| TD | 160,200 | 163,000 | 146,900 | 164,000 | 127,000 | 136,000 |

ESCORENE HD7755 is a polyethylene polymer available from ExxonMobil Chemical Company in Mt. Belvue, Tex., having an $I_{21}$ of 7.5, and MIR of 125, an Mw of 180,000, a density of 0.95 g/cc, produced using a dual reactor system.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. It is also contemplated that the combination of the slurry and the solution immobilization technique of the invention can be used to essentially form, for example, a metallocene catalyst compound that is combined with an activator and fed to a polymerization reactor.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

We claim:

1. A process to control polymer properties comprising:
   a) continuously combining a catalyst component slurry with a catalyst component solution to form a catalyst composition;
   b) combining the catalyst composition with one or more olefin(s) in a polymerization reactor to form a polymer product;
   c) measuring a sample of the polymer product to obtain an initial product property; and
   d) changing a process parameter to obtain a second product property.

2. The process of claim 1 wherein the catalyst component slurry comprises a first catalyst compound and the catalyst component solution comprises a second catalyst compound.

3. The process of claim 2 wherein the molar ratio of the first catalyst compound to the second catalyst compound in the catalyst composition is between about 500:1 to about 1:500.

4. The process of claim 1 wherein the product property is selected form the group consisting of flow index, melt index, density, MWD, comonomer content, and combinations thereof.

5. The process of claim 1 wherein step d) is selected from the group consisting of changing a hydrogen concentration, changing a first catalyst amount, changing a second catalyst amount, changing an amount of a liquid and/or a gas that is withdrawn from the reactor, changing a polymerization temperature, changing an olefin(s) partial pressure, changing an olefin to comonomer ratio, changing an activator to a transition metal ratio, changing a relative feed rates of the catalyst component slurry and/or the catalyst component solution; changing a time or a degree of or a temperature of the combining of the catalyst component slurry and the catalyst component solution and combinations thereof.

6. The process of claim 3 wherein product property is flow index and wherein the process parameter is selected from the group consisting of temperature, catalyst compound feed rate, a molar ratio of the first and second catalyst compound, monomer partial pressure, oxygen concentration, hydrogen concentration, and a combination thereof.

7. The process of claim 6 wherein the sample of polymer product are melt-homogenized before the flow index is measured.

8. The process of claim 1 wherein the process parameter is monomer partial pressure.

9. The process of claim 2 wherein the first catalyst compound is a Group 15 containing metal compound and where in the second catalyst compound is a bulky ligand metallocene compound.

10. A process to control polymer properties comprising:
   a) continuously combining a catalyst component slurry with a catalyst component solution to form a catalyst composition;
   b) combining the catalyst composition with one or more olefin(s) in a polymerization reactor to form a polymer product;
   c) measuring a sample of the polymer product to obtain an initial flow index; and
   d) changing a process parameter to obtain a second flow index.

11. A process to control polymer properties comprising:
   a) continuously combining a catalyst component slurry delivered at a first feed rate with a catalyst component solution delivered at a second feed rate to form a catalyst composition;
   b) introducing the catalyst composition into a polymerization reactor with one or more olefin(s) to form a polymer product;
   c) measuring a sample of the polymer product to obtain an initial flow index; and
   d) altering the first feed rate and/or the second feed rate to obtain a second flow index.

* * * * *